US 12,049,937 B2

United States Patent
Uehara et al.

(10) Patent No.: US 12,049,937 B2
(45) Date of Patent: Jul. 30, 2024

(54) DAMPER DEVICE

(71) Applicant: EXEDY Corporation, Neyagawa (JP)

(72) Inventors: Hiroshi Uehara, Neyagawa (JP); Masahiko Aoki, Neyagawa (JP)

(73) Assignee: EXEDY Corporation, Osaka (JP)

( * ) Notice: Subject to any disclaimer, the term of this patent is extended or adjusted under 35 U.S.C. 154(b) by 520 days.

(21) Appl. No.: 17/380,293

(22) Filed: Jul. 20, 2021

(65) Prior Publication Data
US 2022/0056982 A1 Feb. 24, 2022

(30) Foreign Application Priority Data
Aug. 20, 2020 (JP) .................. 2020-139616

(51) Int. Cl.
*F16F 15/139* (2006.01)
(52) U.S. Cl.
CPC .............. *F16F 15/1392* (2013.01)
(58) Field of Classification Search
CPC ........ F16D 7/025; F16D 7/027; F16D 43/215; F16D 43/216; F16F 15/129; F16F 15/1292; F16F 15/134; F16F 15/137; F16F 15/139; F16F 15/1392; F16F 15/145
USPC .............................. 464/68.4, 68.41
See application file for complete search history.

(56) References Cited

U.S. PATENT DOCUMENTS

| 5,634,543 A | * | 6/1997 | Hashimoto | F16F 15/1238 464/68.4 |
| 5,829,567 A | * | 11/1998 | Ament | F16F 15/1292 192/213.2 |
| 6,016,899 A | * | 1/2000 | Ament | F16F 15/1207 464/68.6 |
| 6,019,206 A | * | 2/2000 | Rohs | F16F 15/1292 192/213.1 |

(Continued)

FOREIGN PATENT DOCUMENTS

| DE | 102012214022 A1 | * | 2/2014 | .......... F16F 15/1292 |
| DE | 102014215272 A1 | * | 3/2015 | .......... F16F 15/1392 |

(Continued)

OTHER PUBLICATIONS

Notice of Reasons for Rejection in corresponding Japanese Patent Application No. 2020-139616, dated Feb. 13, 2024.

*Primary Examiner* — Josh Skroupa
(74) *Attorney, Agent, or Firm* — United IP Counselors, LLC

(57) ABSTRACT

A damper device includes a first rotor, a second rotor, an elastic coupling part having first and second elastic members, and a hysteresis generating mechanism. The hysteresis generating mechanism includes a friction member, and generates a hysteresis torque. The friction member does not make frictional contact with the first and second rotors in a first torsion angular range where the torsion is caused between the first and second rotors by a first torsion angle from a neutral condition, makes frictional contact with the first or second rotor in a second torsion angular range (Continued)

exceeding the first torsion angle so as to generate the hysteresis torque, and does not make frictional contact with the first and second rotors in a predetermined torsion angular range within the second torsion angular range. In the neutral condition, the friction member is set in a neutral position by actuation of the elastic coupling part.

9 Claims, 19 Drawing Sheets

(56) References Cited

U.S. PATENT DOCUMENTS

| | | | |
|---|---|---|---|
| 6,676,525 B2 | 1/2004 | Uehara | |
| 7,192,354 B2* | 3/2007 | Uehara | F16F 15/1292 |
| | | | 464/68.4 |
| 7,954,239 B2* | 6/2011 | Uno | F16D 7/025 |
| | | | 74/574.3 |
| 8,033,918 B2* | 10/2011 | Yoshimura | F16F 15/1214 |
| | | | 464/68.41 |
| 8,998,728 B2* | 4/2015 | Komuro | F16F 15/1292 |
| | | | 464/68.41 |
| 9,151,332 B2* | 10/2015 | Jimbo | F16F 15/145 |
| 10,208,807 B2* | 2/2019 | Miyagawa | F16F 15/1297 |
| 10,648,532 B2 | 5/2020 | Tomita et al. | |
| 10,995,817 B2* | 5/2021 | Yamazumi | F16F 15/1203 |
| 11,841,061 B2 | 12/2023 | Uehara | |
| 11,965,576 B2 | 4/2024 | Uehara et al. | |
| 2014/0221106 A1* | 8/2014 | Jimbo | F16F 15/145 |
| | | | 464/45 |
| 2017/0152913 A1* | 6/2017 | Pereira | F16F 15/1292 |

FOREIGN PATENT DOCUMENTS

| | | | | |
|---|---|---|---|---|
| EP | 1589256 A1 * | 10/2005 | | F16F 15/139 |
| JP | 2002340095 A | 11/2002 | | |
| JP | 2002-372101 A | 12/2002 | | |
| JP | 2010203558 | 9/2010 | | |
| JP | 2017125579 | 7/2017 | | |
| JP | 2017082981 A | 11/2019 | | |
| WO | WO-2015090308 A1 * | 6/2015 | | F16F 15/139 |

* cited by examiner

DAMPER DEVICE

CROSS-REFERENCE TO RELATED APPLICATIONS

This application claims priority to Japanese Patent Application No. 2020-139616, filed Aug. 20, 2020. The entire contents of that application are incorporated by reference herein in their entirety.

TECHNICAL FIELD

The present invention relates to a damper device.

BACKGROUND ART

In general, noises and vibrations of vehicles include noises in idling, noises in traveling, and tip-in/tip-out (low frequency vibrations). Damper devices are provided for inhibiting the noises and vibrations described above.

In torsional characteristics of a damper device, a low torsion angular range relates to noises in idling, and a low torsional stiffness is preferable in the low torsion angular range. On the other hand, to countermeasure tip-in/tip-out, the torsional characteristics are required to have the highest possible stiffness in a high torsion angular range. Moreover, when minute vibrations attributed to e.g., variation in engine combustion are inputted in the high torsion angular range, a hysteresis torque is required to be made small in a minute angular range within the high torsion angular range so as to attenuate the minute vibrations.

In view of the above, there has been produced a type of damper device as described in Japan Laid-open Patent Application Publication No. 2002-372101. The damper device has two-stage torsional characteristics. A low stiffness and a low hysteresis torque are obtained in a low torsion angular range, whereas a high stiffness and a high hysteresis torque are obtained in a high torsion angular range. Besides, a hysteresis torque is configured not to act in a minute torsion angular range within the high torsion angular range.

The damper device described in Japan Laid-open Patent Application Publication No. 2002-372101 is required to have such a configuration that a hub flange, provided as an output-side member, is divided into a hub having a tubular shape and a flange provided on the outer peripheral side of the hub so as to obtain the two-stage torsional characteristics and prevent the hysteresis torque from being generated in the minute torsion angular range within the high torsion angular range. Hence, the damper device is quite complicated in configuration.

BRIEF SUMMARY

It is an object of the present invention to enable a damper device, with a simple configuration, to generate a small hysteresis torque in a low torsion angular range and generate a sufficient hysteresis torque in a high torsion angular range, and simultaneously, to effectively attenuate minute vibrations.

(1) A damper device according to the present invention includes a first rotor rotated about a rotational axis, a second rotor rotated about the rotational axis, an elastic coupling part, and a hysteresis generating mechanism. The second rotor is disposed to be rotatable relative to the first rotor. The elastic coupling part includes a first elastic member and a second elastic member and elastically couples the first and second rotors in a rotational direction. The hysteresis generating mechanism includes a friction member disposed to be capable of making frictional contact with the first or second rotor. The hysteresis generating mechanism generates a hysteresis torque when torsion is caused by rotation of the second rotor relative to the first rotor.

The friction member of the hysteresis generating mechanism does not make frictional contact with the first and second rotors in a low torsion angular range that the torsion is caused between the first and second rotors by a first torsion angle from a neutral condition without the torsion. Besides, the friction member makes frictional contact with the first or second rotor so as to generate the hysteresis torque in a high torsion angular range exceeding the first torsion angle. On the other hand, the friction member does not make frictional contact with the first and second rotors in a predetermined minute torsion angular range included in the high torsion angular range. The friction member is further set in a neutral position by actuation of the first and second elastic members in the neutral condition.

It should be noted that the term "neutral position" of the friction member refers to a rotation-directional position of the friction member in the neutral condition without the torsion between the first and second rotors.

Here, the friction member does not make frictional contact with the first and second rotors in the low torsion angular range that the torsion is caused between the first and second rotors by the first torsion angle from the neutral condition made at a torsion angle of 0 degree. Therefore, a hysteresis torque attributed to the friction member is not generated in this case, whereby a hysteresis torque of the entire device can be made small in the low torsion angular range. By contrast, in the high torsion angular range, i.e., when that the torsion angle exceeds the first torsion angle, the friction member makes frictional contact with the first or second rotor, whereby a hysteresis torque is generated. Furthermore, in the predetermined minute torsion angular range included in the high torsion angular range, the friction member does not make frictional contact with the first and second rotors, whereby a hysteresis torque attributed to the friction member is not generated.

Then, when the neutral condition is restored from the torsion between the first and second rotors, the friction member is set in the neutral position by the actuation of the first and second elastic members. Put differently, in the neutral condition, the friction member is constantly maintained in the neutral position.

As described above, in the neutral condition, the friction member can be constantly maintained in the neutral position with use of the elastic members basically used in any kind of damper device. Besides, the friction member is not actuated in the low torsion angular range. Contrarily, the friction member is actuated in the high torsion angular range, although not actuated in the minute torsion angular range included in the high torsion angular range. Therefore, the damper device is enabled, with a simple configuration, to obtain a small hysteresis torque in the low torsion angular range and obtain a sufficient hysteresis torque in the high torsion angular range, and simultaneously, to effectively attenuate minute vibrations in traveling.

(2) Preferably, the first rotor includes a first support portion and a second support portion. Besides, the second rotor includes a first accommodation portion and a second accommodation portion. The first accommodation portion is disposed to overlap in part the first support portion and be offset from the first support portion to a first side in the rotational direction as seen in an axial direction. The second accommodation portion is disposed to overlap in part the second support portion and be offset from the second support portion to a second side in the rotational direction as seen in the axial direction. In this case, the first elastic member is initially disposed in a compressed state in the first support portion and the first accommodation portion. On the other hand, the second elastic member is initially disposed in a compressed state in the second support portion and the second accommodation portion and is actuated in parallel with the first elastic member.

Here, each support portion and each corresponding accommodation portion are disposed to be offset from each other to the opposite sides in the rotational direction, and each elastic member is disposed in the compressed state in each support portion and each corresponding accommodation portion. Therefore, a rotation-directional gap exists between each elastic member (and the friction member actuated by each elastic member) and one end surface of either of each support portion and each corresponding accommodation portion, in both of which each elastic member is disposed. Because of this, the friction member does not make frictional contact with the first and second rotors by a torsion angle corresponding to the rotation-directional gap.

Then, when the second rotor is rotated relative to the first rotor such that the rotation-directional gap is eliminated between each elastic member and one end surface of either each support portion or each corresponding accommodation portion, the friction member stops rotating but the first or second rotor rotates. Hence, the friction member and the first or second rotor make frictional contact with each other, whereby a hysteresis torque is generated therebetween.

(3) Preferably, an amount of offset between the first support portion and the first accommodation portion is equal to an amount of offset between the second support portion and the second accommodation portion. Besides, the first torsion angle is greater than a corresponding torsion angle to the amount of offset. In this case, the friction member does not make frictional contact with the first and second rotors when the torsion is caused between the first and second rotors from the neutral condition by the corresponding torsion angle to the amount of offset and when the torsion is caused therebetween by the first torsion angle from the neutral condition. On the other hand, the friction member makes frictional contact with either the first or second rotor when the torsion is caused between the first and second rotors by a greater angle than the corresponding torsion angle to the amount of offset. Besides, the friction member does not make frictional contact with both the first and second rotors in a torsion angular range of a difference between the first torsion angle and the corresponding torsion angle to the amount of offset.

(4) Preferably, the friction member is rotatable relative to the first or second rotor until the torsion is caused by the corresponding torsion angle to the amount of offset and until the torsion is caused by the first torsion angle.

(5) Preferably, the friction member includes a first contact portion and a second contact portion. The first contact portion causes the first elastic member to make contact therewith at an end surface thereof located on the first side in the rotational direction. The second contact portion causes the second elastic member to make contact therewith at an end surface thereof located on the second side in the rotational direction.

Here, the friction member makes contact with one of the end surfaces (i.e., the end surface located on one side) of the first elastic member, while making contact with one of the end surfaces (i.e., the end surface located on the other side) of the second elastic member. Besides, the first and second elastic members are disposed, while being initially compressed to the opposite sides in the rotational direction. Therefore, in the neutral condition, the friction member is constantly set in the neutral position by the first and second elastic members.

(6) Preferably, the first elastic member transitions from the compressed state to a free state and is then further compressed when the torsion of the first rotor with respect to the second rotor is caused from the neutral condition to the first side in the rotational direction. By contrast, the first elastic member is further compressed from the compressed state when the torsion of the first rotor with respect to the second rotor is caused from the neutral condition to the second side in the rotational direction.

On the other hand, in this case, the second elastic member transitions from the compressed state to a free state and is then further compressed when the torsion of the first rotor with respect to the second rotor is caused from the neutral condition to the second side in the rotational direction. By contrast, the second elastic member is further compressed from the compressed state when the torsion of the first rotor with respect to the second rotor is caused from the neutral condition to the first side in the rotational direction.

It should be noted that the term "free state" herein refers to a state of each elastic member that has a free length without being compressed or extended.

In the present damper device, in the neutral condition, the first and second rotors receive both a torsional torque acting to the first side in the rotational direction and a torsional torque acting to the second side in the rotational direction from the first and second elastic members each disposed in the compressed state. Therefore, even in fluctuations in input torque less than or equal to the torsional torque generated by the compressed elastic member, the first and second rotors are not rotated relative to each other. Because of this, it is possible to inhibit collision sound produced between respective members due to torque fluctuations in a predetermined torsion angular range.

(7) Preferably, the first and second support portions each include a first support surface on one end thereof located on the first side in the rotational direction and each include a second support surface on the other end thereof located on the second side in the rotational direction. Besides, the first and second accommodation portions each include a first accommodation surface on one end thereof located on the first side in the rotational direction and each include a second accommodation surface on the other end thereof located on the second side in the rotational direction. In this case, the first elastic member is disposed in the compressed state between the first support surface and the second accommodation surface. On the other hand, the second elastic member is disposed in the compressed state between the first accommodation surface and the second support surface.

(8) Preferably, the first and second elastic members are equal in stiffness.

(9) Preferably, the elastic coupling part further includes a third elastic member and a fourth elastic member. The third and fourth elastic members are each initially disposed in a compressed state in the neutral condition. Besides, the third elastic member transitions from the compressed state to a free state and is then further compressed when the torsion of the first rotor with respect to the second rotor is caused from the neutral condition to the first side in the rotational direction. The fourth elastic member transitions from the compressed state to a free state and is then further compressed when the torsion of the first rotor with respect to the second rotor is caused from the neutral condition to the second side in the rotational direction.

(10) Preferably, the first rotor includes a third support portion and a fourth support portion. The third support portion opposed to the first support portion with respect to the rotational axis. The fourth support portion is opposed to the second support portion with respect to the rotational axis. Besides, the second rotor includes a third accommodation portion and a fourth accommodation portion. The third accommodation portion is opposed to the first accommodation portion with respect to the rotational axis. The fourth accommodation portion is opposed to the second accommodation portion with respect to the rotational axis.

In this case, the third accommodation portion is disposed to overlap in part the third support portion and be offset from the third support portion to the first side in the rotational direction as seen in the axial direction. On the other hand, the fourth accommodation portion is disposed to overlap in part the fourth support portion and be offset from the fourth support portion to the second side in the rotational direction as seen in the axial direction. Furthermore, the third elastic member is initially disposed in the compressed state in the third support portion and the third accommodation portion. On the other hand, the fourth elastic member is initially disposed in the compressed state in the fourth support portion and the fourth accommodation portion and is actuated in parallel with the third elastic member.

Overall, according to the present invention described above, the damper device is enabled, with a simple configuration, to generate a small hysteresis torque in a low torsion angular range and generate a sufficient hysteresis torque in a high torsion angular range, and simultaneously, to effectively attenuate minute vibrations.

DETAILED DESCRIPTION

Entire Configuration

Figure 1:
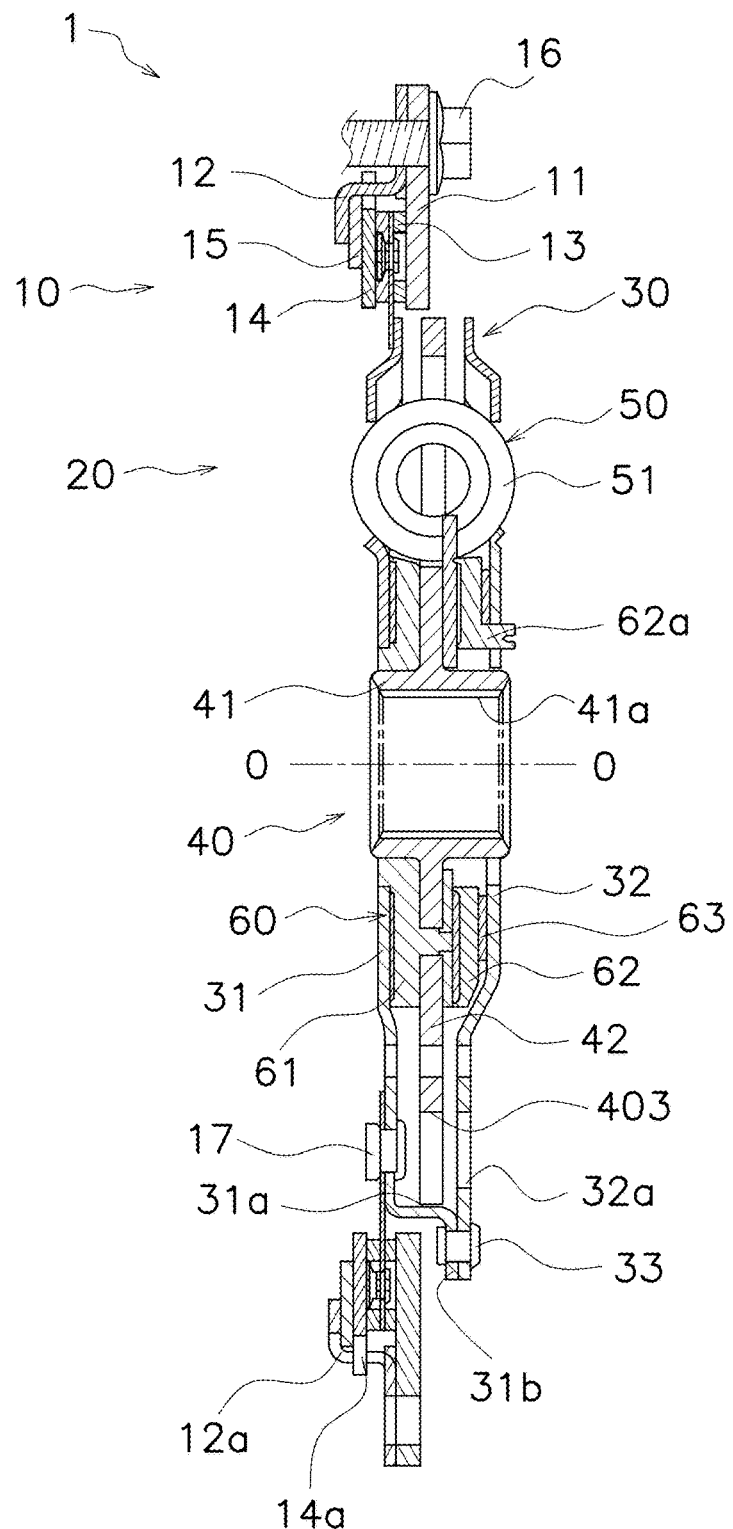
FIG. 1 is a cross-sectional view of a damper device according to a preferred embodiment of the present invention.
Figure 2:
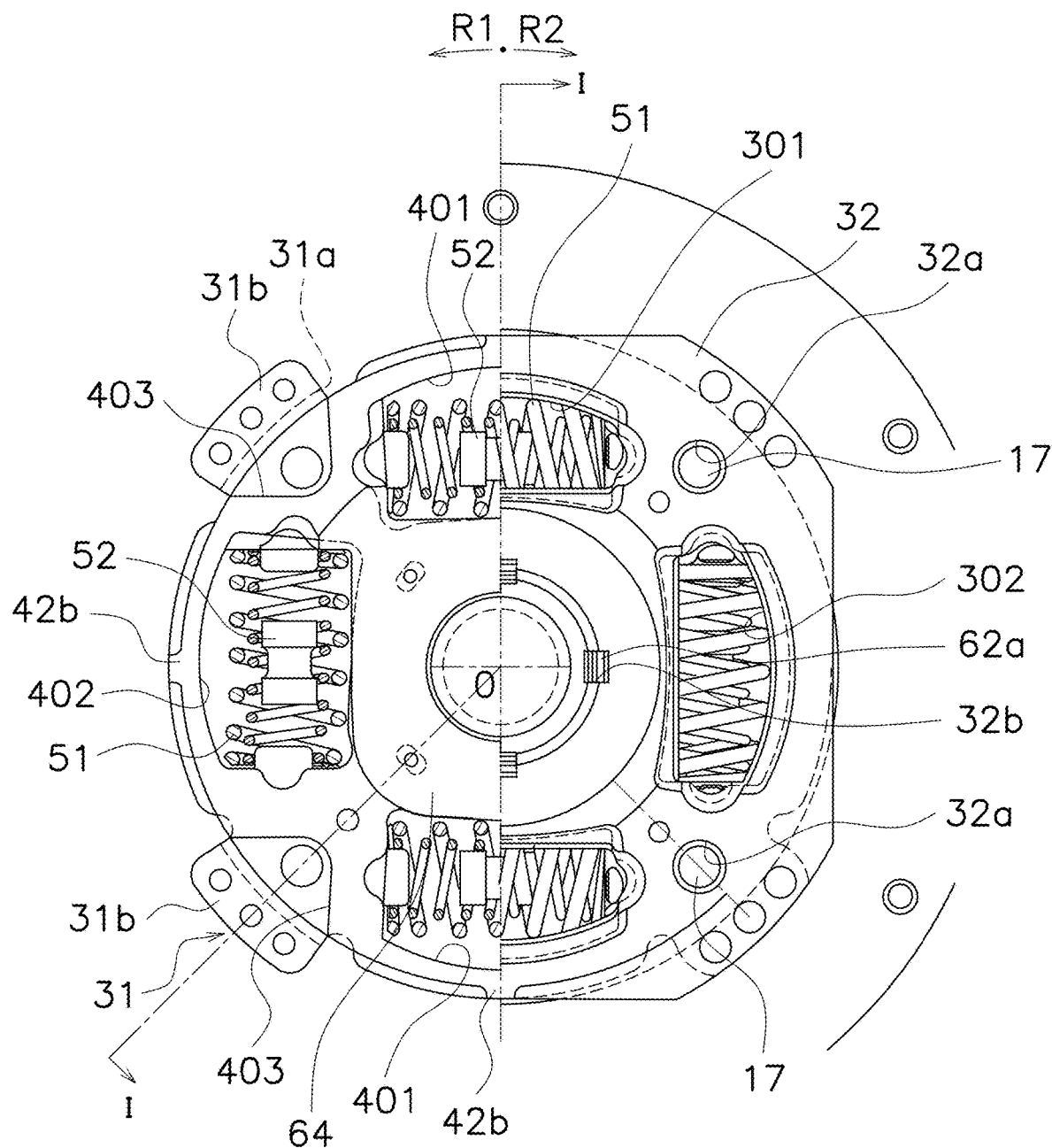
FIG. 2 is a front view of the damper device shown in FIG. 1.

FIG. 1 is a cross-sectional view of a torque limiter embedded damper device 1 (hereinafter simply referred to as "damper device 1") according to a preferred embodiment of the present invention. On the other hand, FIG. 2 is a front view of the damper device 1, from part of which some constituent members are detached. In FIG. 1, an engine (not shown in the drawing) is disposed on the left side of the damper device 1, whereas a drive unit (not shown in the drawing), including an electric motor, a transmission, and so forth, is disposed on the right side of the damper device 1.

It should be noted that in the following explanation, the term "axial direction" refers to an extending direction of a rotational axis O of the damper device 1. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O. Likewise, the radial direction is not required to be perfectly matched with a diameter direction of the imaginary circle about the rotational axis O.

The damper device 1 is a device provided between a flywheel (not shown in the drawings) and an input shaft of the drive unit in order to limit a torque transmitted between the engine and the drive unit and attenuate rotational fluctuations. The damper device 1 includes a torque limiter unit 10 and a damper unit 20.

Torque Limiter Unit 10

The torque limiter unit 10 is disposed on the outer peripheral side of the damper unit 20. The torque limiter unit 10 limits a torque transmitted between the flywheel and the damper unit 20. The torque limiter unit 10 includes a cover plate 11, a support plate 12, a friction disc 13, a pressure plate 14, and a cone spring 15.

The cover plate 11 and the support plate 12 are disposed at a predetermined interval in the axial direction and are fixed at the outer peripheral parts thereof to the flywheel by a plurality of bolts 16.

The friction disc 13, the pressure plate 14, and the cone spring 15 are disposed axially between the cover plate 11 and the support plate 12.

The friction disc 13 includes a core plate and a pair of friction members fixed to both lateral surfaces of the core plate. The friction disc 13 is herein fixed at the inner peripheral part thereof to the damper unit 20 by a plurality of rivets 17. The pressure plate 14 and the cone spring 15 are disposed between the friction disc 13 and the support plate 12.

The pressure plate 14 has an annular shape and is disposed on the support plate 12 side of the friction disc 13. It should be noted that the pressure plate 14 is provided with a plurality of pawls 14a in the outer peripheral part thereof, and the pawls 14a are engaged with a plurality of engaging holes 12a provided in the support plate 12.

The cone spring 15 is disposed between the pressure plate 14 and the support plate 12. The cone spring 15 presses the friction disc 13 against the cover plate 11 through the pressure plate 14.

Damper Unit 20

The damper unit 20 includes an input-side plate 30 (exemplary first rotor), a hub flange 40 (exemplary second rotor), an elastic coupling part 50, and a hysteresis generating mechanism 60.

Input-Side Plate 30

The input-side plate 30 includes a first plate 31 and a second plate 32. The first and second plates 31 and 32, each of which is made in shape of a disc including a hole in the center part thereof, are disposed at an interval in the axial direction. The first plate 31 includes four stopper portions 31a and four fixation portions 31b in the outer peripheral part thereof. Besides, the first and second plates 31 and 32 each include a pair of first support portions 301 and a pair of second support portions 302. The first and second support portions 301 and 302 provided in the first plate 31 are identical in position to those provided in the second plate 32. Furthermore, the first plate 31 is provided with assembling holes 32a in corresponding positions to the rivets 17.

The stopper portions 31a are formed by bending the outer peripheral part of the first plate 31 toward the second plate 32 and extend in the axial direction. The fixation portions 31b are formed by bending the distal ends of the stopper portions 31a radially outward. The fixation portions 31b are fixed to the outer peripheral end of the second plate 32 by a plurality of rivets 33. Because of this, the first and second plates 31 and 32 are non-rotatable relative to each other and are axially immovable from each other.

The pair of first support portions 301 is opposed to each other with respect to the rotational axis O. On the other hand, the pair of second support portions 302 is opposed to each other with respect to the rotational axis O, while being displaced from the pair of first support portions 301 at an angular interval of 90 degrees. Each support portion 301, 302 includes a hole axially penetrating therethrough and an edge part formed by cutting and raising the inner and outer peripheral edges of the hole.

Figure 3A:
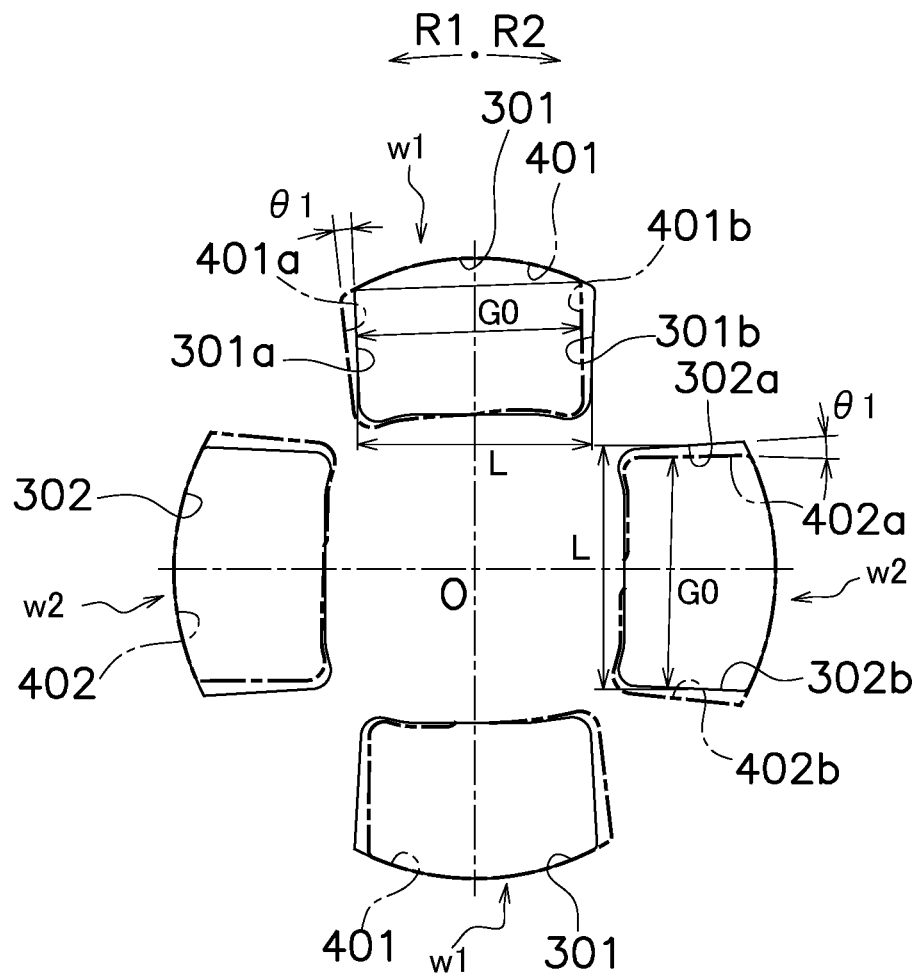
FIG. 3A is a schematic diagram showing a relation between an input-side plate and a hub flange.
Figure 3B:
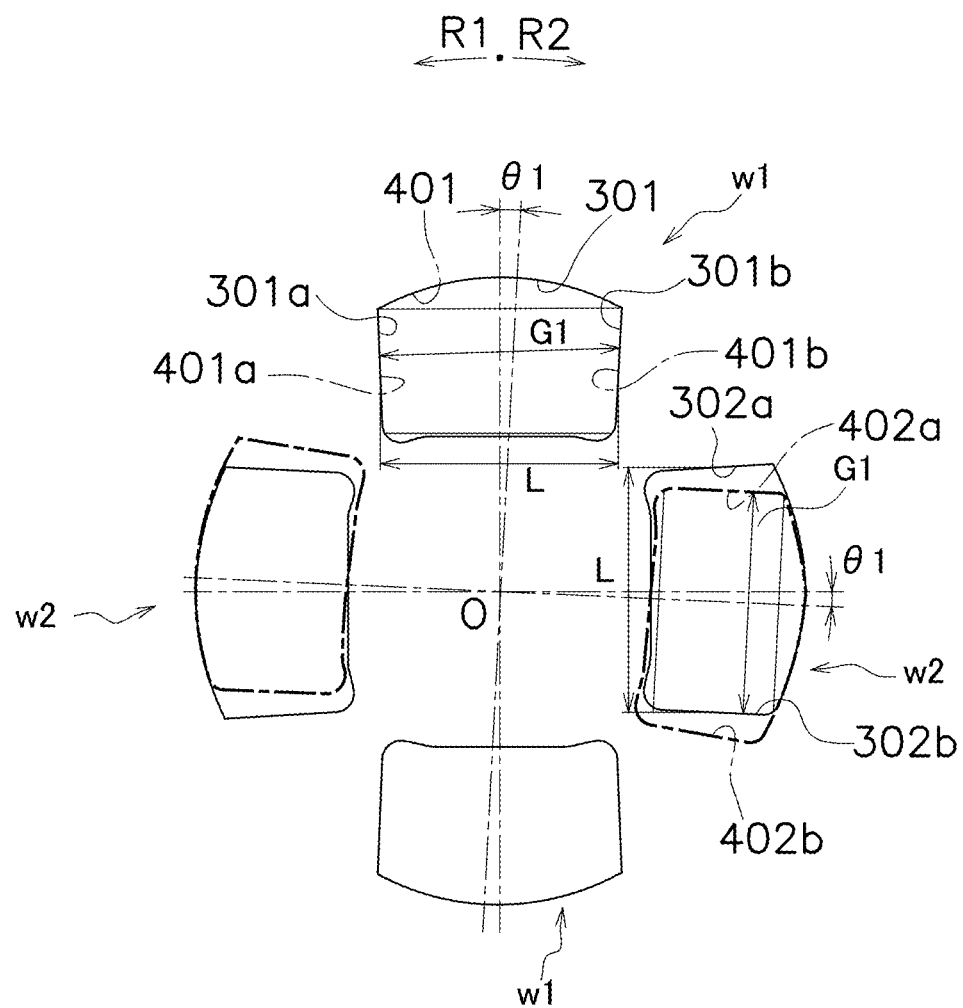
FIG. 3B is a schematic diagram of the relation where the input-side plate and the hub flange are rotated relative to each other by an angle θ1.
Figure 3C:
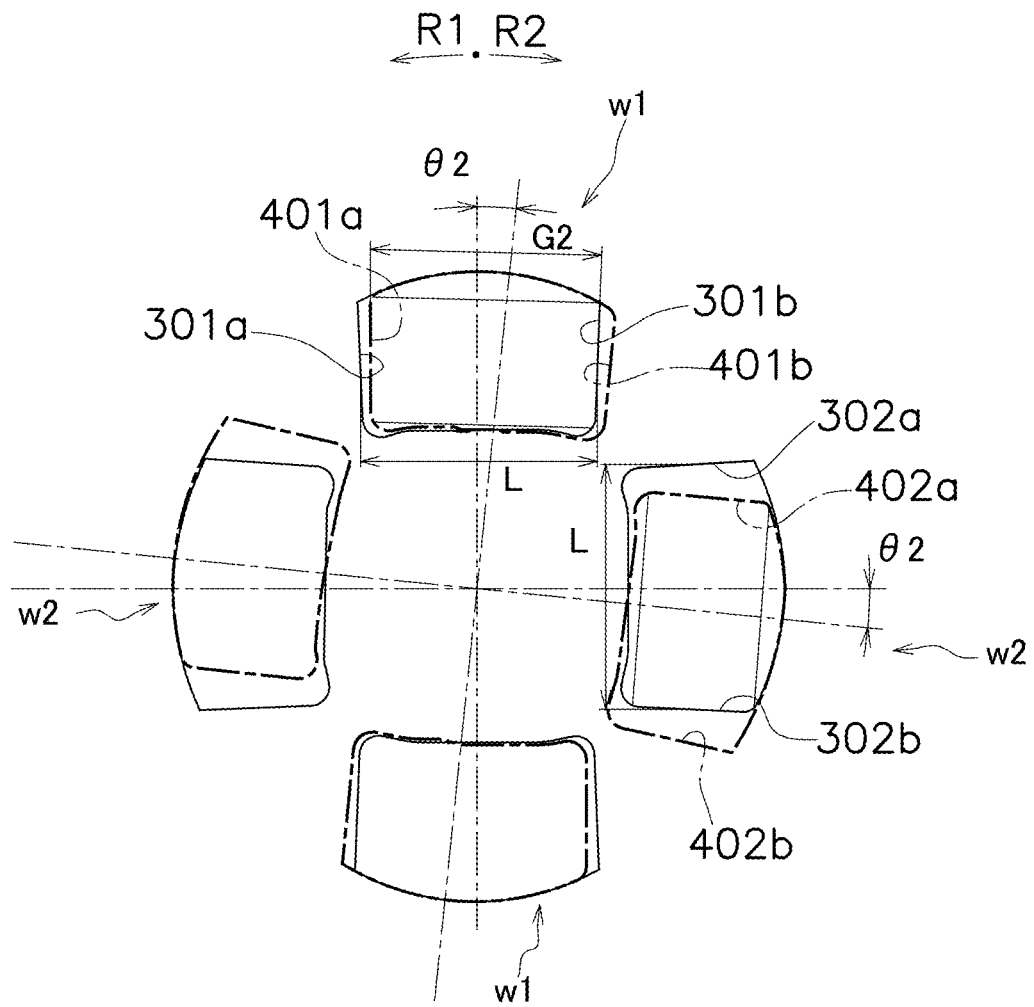
FIG. 3C is a schematic diagram of the relation where the input-side plate and the hub flange are rotated relative to each other by an angle θ2.

As schematically shown in FIGS. 3A to 3C, each support portion 301, 302 includes an R1 support surface 301a, 302a on one end thereof located on a first side in the rotational direction (hereinafter simply referred to as "R1 side") and includes an R2 support surface 301b, 302b on the other end thereof located on a second side in the rotation direction (hereinafter simply referred to as "R2 side"). In each support portion 301, 302, the width of the hole (distance between the R1 and R2 support surfaces) is L.

It should be noted that in FIGS. 3A to 3C, the first and second support portions 301 and 302 are depicted with solid line, whereas first and second accommodation portions 401 and 402 (to be described) of the hub flange 40 are depicted with dashed-dotted line. It should be also noted that FIGS. 3A to 3C are schematic diagrams and are therefore different from FIG. 2 in which constituent members are depicted in actual specific shape.

Hub Flange 40

As shown in FIGS. 1 and 2, the hub flange 40 includes a hub 41 and a flange 42 that are integrated with each other. The hub flange 40 is rotatable relative to the input-side plate 30 in a predetermined angular range. The hub 41 has a tubular shape and is provided with a spline hole 41a in the center part thereof. Besides, the hub 41 penetrates both holes provided in the center parts of the first and second plates 31 and 32. The flange 42, having a disc shape, is shaped to extend radially outward from the outer peripheral surface of the hub 41. The flange 42 is disposed axially between the first and second plates 31 and 32.

The flange 42 includes four stopper protrusions 42b, a pair of first accommodation portions 401, a pair of second accommodation portions 402, and four cutouts 403.

The four stopper protrusions 42b are shaped to protrude radially outward from the outer peripheral surface of the flange 42. Each stopper protrusion 42b is provided in a position located radially outside the circumferential middle of each accommodation portion 401, 402. Now, when the input-side plate 30 and the hub flange 40 are rotated relative to each other, the stopper protrusions 42b make contact with the stopper portions 31a of the first plate 31. Accordingly, relative rotation is prevented between the input-side plate 30 and the hub flange 40.

As shown in FIGS. 3A to 3C, the pair of first accommodation portions 401 is disposed in corresponding positions to the pair of first support portions 301. On the other hand, the pair of second accommodation portions 402 is disposed in corresponding positions to the pair of second support portions 302. When explained in more detail, in a neutral condition (at a torsion angle of 0 degree) that an angle of relative rotation between the input-side plate 30 and the hub flange 40 is 0 degree, and in other words, torsion is not caused between the input-side plate 30 and the hub flange 40, as shown in FIG. 3A, the pair of first accommodation portions 401 is disposed to overlap in part the pair of first support portions 301 and be offset (or displaced) from the pair of first support portions 301 to the R1 side by an angle θ1 (e.g., a torsion angle of 2 degrees) as seen in the axial direction. On the other hand, the pair of second accommodation portions 402 is disposed to overlap in part the pair of second support portions 302 and be offset (or displaced) from the pair of second support portions 302 to the R2 side by the identical angle θ1 to the above as seen in the axial direction.

Each accommodation portion 401, 402 is an approximately rectangular hole that the outer peripheral part thereof is made in shape of a circular arc. As shown in FIGS. 3A to 3C, each accommodation portion 401, 402 includes an R1 accommodation surface 401b, 402a on one end thereof located on the R1 side and includes an R2 accommodation surface 401b, 402b on the other end thereof located on the R2 side. In each accommodation portion 401, 402, the width of the hole (distance between the R1 accommodation surface 401a, 402a and the R2 accommodation surface 401b, 402b) is set to be L in similar manner to the width of the hole in each support portion 301, 302.

The four cutouts 403 are each provided circumferentially between adjacent two accommodation portions 401 and 402 and are recessed radially inward from the outer peripheral surface of the flange 42 at a predetermined depth. The cutouts 403 are provided in corresponding positions to the rivets 17 by which the first plate 31 and the friction disc 13 of the torque limiter unit 10 are coupled to each other. Therefore, the torque limiter unit 10 and the damper unit 20, assembled in different steps, can be fixed to each other by the rivets 17 with use of the assembling holes 32a of the second plate 32 and the cutouts 403 of the flange 42.

Elastic Coupling Part 50

The elastic coupling part 50 includes four coil springs 51 (exemplary first and second elastic members) and four resin members 52. Each coil spring 51 is composed of an outer spring and an inner spring. The four coil springs 51 are accommodated in the accommodation portions 401 and 402 of the flange 42, respectively, while being supported in both radial and axial directions by the support portions 301 and 302 of the input-side plate 30, respectively. The coil springs 51 are actuated in parallel.

Incidentally, the four coil springs 51 are equal in free length. The free length of each coil spring 51 is equal to the width L of each of each support portion 301, 302 and each accommodation portion 401, 402. Besides, the four coil springs 51 are equal in stiffness. Likewise, the four resin members 52 are equal in stiffness.

Accommodation States of Coil Springs 51

Now, a layout of the support portions 301 and 302 and the accommodation portions 401 and 402 and an accommodation state of each coil spring 51, which are made in the neutral condition, will be hereinafter explained in detail. It should be noted that in the following explanation, on an as-needed basis, a set of the first support portion 301 and the first accommodation portion 401 will be referred to as "first window set w1", whereas a set of the second support portion 302 and the second accommodation portion 402 will be referred to as "second window set w2".

As described above, in the neutral condition as shown in FIG. 3A, each of the pair of first accommodation portions 401 is offset from corresponding one of the pair of first support portions 301 to the R1 side by the angle $\theta 1$. On the other hand, each of the pair of second accommodation portions 402 is offset from corresponding one of the pair of the second support portions 302 to the R2 side by the angle $\theta 1$. Besides, each coil spring 51 is attached in a compressed state to an opening (axially penetrating hole) formed by axial overlap between each support portion 301, 302 and each corresponding accommodation portion 401, 402.

Specifically, in the neutral condition as shown in FIG. 3A, in each of the pair of first window sets w1, the coil spring 51 makes contact at the R1-side end surface thereof with the R1 support surface 301a, while making contact at the R2-side end surface thereof with the R2 accommodation surface 401b. On the other hand, in each of the pair of second window sets w2, the coil spring 51 makes contact at the R1-side end surface thereof with the R1 accommodation surface 402a, while making contact at the R2-side end surface thereof with the R2 support surface 302b.

Hysteresis Generating Mechanism 60

Figure 4:
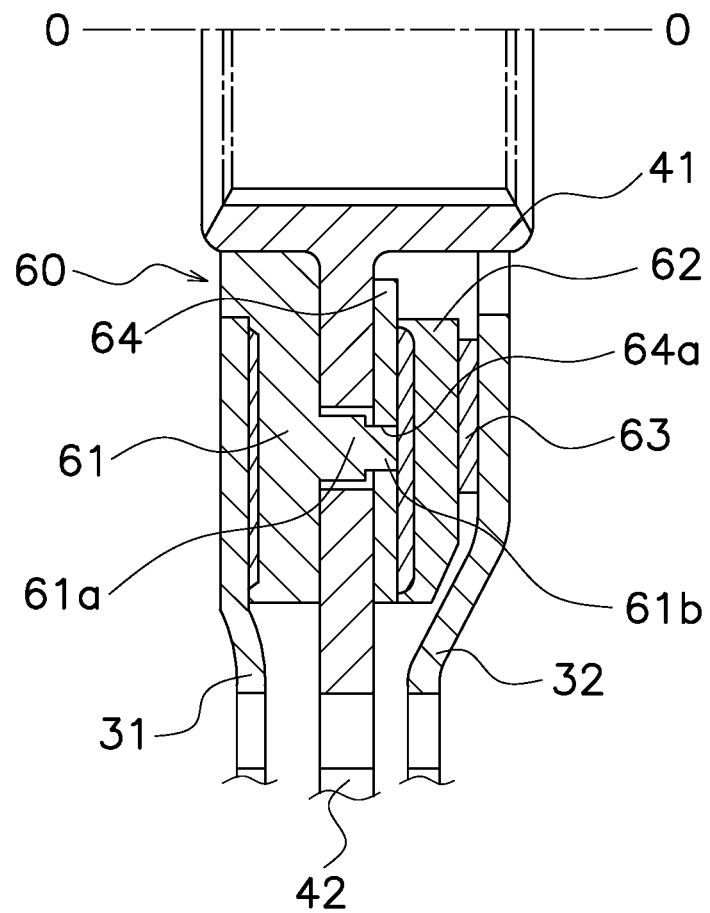
FIG. 4 is an enlarged view of a hysteresis generating mechanism.

As shown in FIGS. 1 and 4, the hysteresis generating mechanism 60 includes a first bushing 61, a second bushing 62, a cone spring 63, and a friction plate 64. It should be noted that FIG. 4 is a partial enlarged view of FIG. 1.

The first bushing 61 is disposed axially between the first plate 31 and the flange 42. The first bushing 61 is provided with a friction member fixed to the first plate 31-side surface thereof. The second bushing 62 is disposed axially between the second plate 32 and the flange 42. The second bushing 62 is provided with a friction member fixed to the flange 42-side surface thereof. Besides, the second bushing 62 is provided with a plurality of engaging protrusions 62a (see FIG. 2) axially protruding from the second plate 32-side surface thereof. The engaging protrusions 62a are engaged with a plurality of engaging holes 32b of the second plate 32, respectively. Therefore, the second bushing 62 and the second plate 32 are unitarily rotated. The cone spring 63 is disposed axially between the second bushing 62 and the second plate 32, while being compressed therebetween. The friction plate 64 is disposed axially between the second bushing 62 and the flange 42.

The first bushing 61, the second bushing 62, and the friction plate 64 are provided as separate members. However, these members 61, 62, and 64 are unitarily actuated and function as friction members of the hysteresis generating mechanism 60. In more detail, as shown in FIG. 4, the first bushing 61 includes a plurality of (two in this example) restriction protrusions 61a and engaging protrusions 61b.

Figure 5:
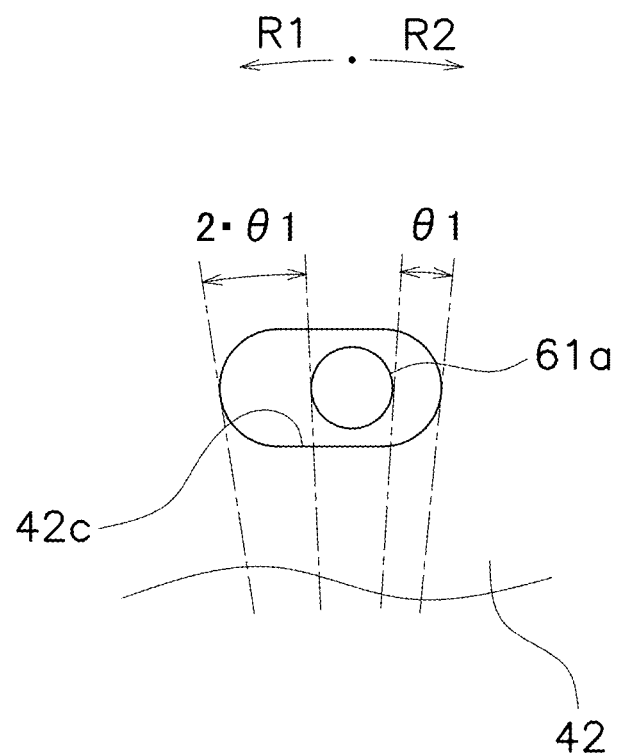
FIG. 5 is a partial enlarged front view of the hysteresis generating mechanism.

The restriction protrusions 61a are shaped to axially protrude from the flange 42-side lateral surface of the first bushing 61. As shown more close-up in FIG. 5 (partial front view), the restriction protrusions 61a penetrate elongated holes 42c, respectively. The elongated holes 42c are provided in the flange 42 so as to extend in the circumferential direction. Now, in the neutral condition, a gap corresponding to a torsion angle $2 \cdot \theta 1$ (exemplary first torsion angle) is produced on the R1 side of each restriction protrusion 61a in each elongated hole 42c, i.e., between each restriction protrusion 61a and one circumferential end surface of each elongated hole 42c, whereas a gap corresponding to a torsion angle $\theta 1$ is produced on the R2 side of each restriction protrusion 61a in each elongated hole 42c, i.e., between each restriction protrusion 61a and the other circumferential end surface of each elongated hole 42c (the position of the first bushing 61 and the friction plate 64 in the neutral condition is referred to as "neutral position"). Besides, the engaging protrusions 61b are engaged with engaging holes 64a provided in the friction plate 64.

Therefore, the first bushing 61 and the friction plate 64 are non-rotatable relative to each other and are unitarily rotated. Besides, as described above, the second bushing 62 is unitarily rotated with the second plate 32.

With the configuration described above, the first bushing 61 and the friction plate 64 are rotatable relative to the hub flange 40 by the angle $2 \cdot \theta 1$ to the R1 side and are also rotatable relative thereto by the angle $\theta 1$ to the R2 side. Therefore, basically, frictional contact is not caused between the first bushing 61 and the first plate 31 in the torsion angular range described above; a hysteresis torque is not generated therebetween. Besides, in the torsion angular range described above, the friction plate 64 is rotated in synchronization with the first plate 31. Hence, similarly to the above, frictional contact is not caused between the second bushing 62 and the friction plate 64; a hysteresis torque is not generated therebetween.

On the other hand, when the torsion angle positively or negatively exceeds the torsion angles described above, the first bushing 61 and the friction plate 64 are prevented from being rotated relative to the flange 42. Therefore, frictional contact is caused between the first bushing 61 and the first plate 31 and between the second bushing 62 and the friction plate 64; hysteresis torques are generated therebetween.

Figure 6:
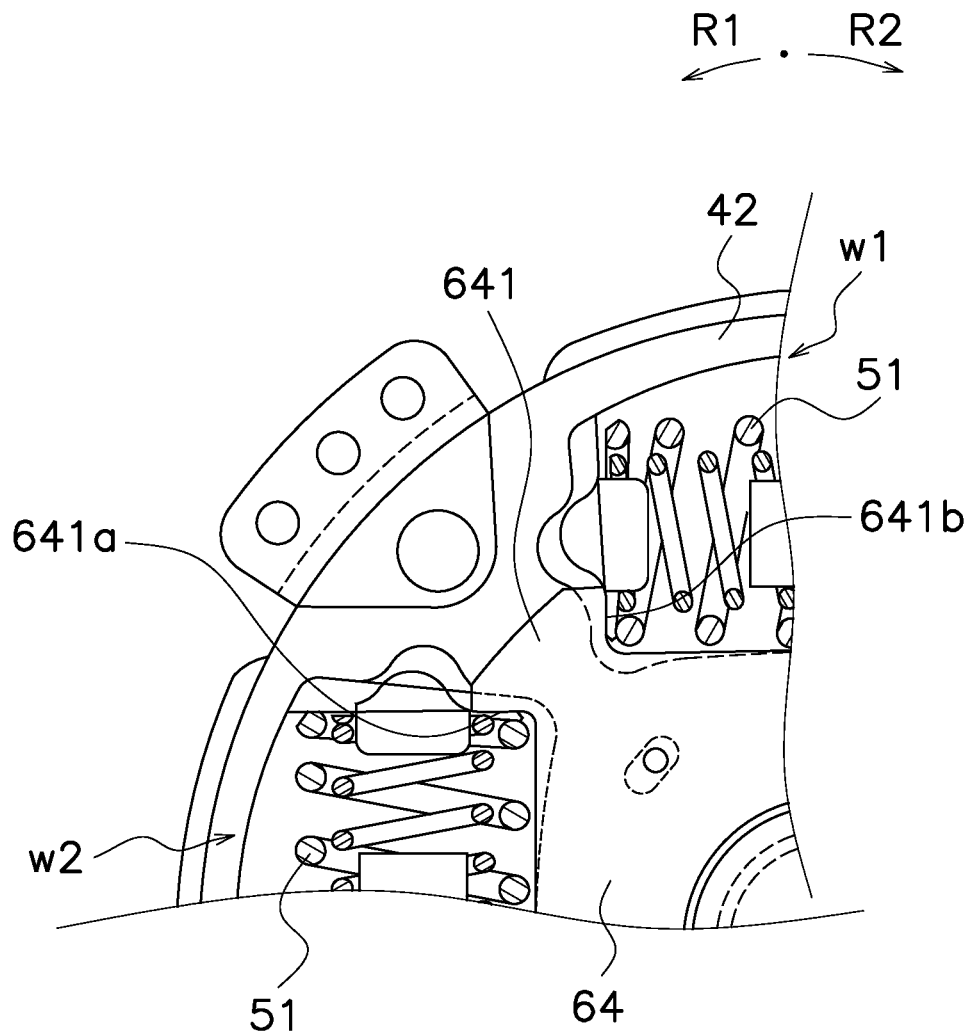
FIG. 6 is a partial enlarged view of FIG. 2.

As shown in FIG. 2 and FIG. 6 that is a partial enlarged view of FIG. 2, the friction plate 64 herein has a rectangular shape as seen from the front side. Besides, the friction plate 64 is provided with two protruding portions 641 protruding radially outward from the outer peripheral surface thereof. The protruding portions 641 are opposed to each other with respect to the rotational axis O. Each protruding portion 641 is located circumferentially between adjacent first and second window sets w1 and w2. Besides, each protruding portion 641 makes contact at an R1-side end surface 641a thereof (exemplary second contact surface) with the R2-side end surface of the coil spring 51 disposed in the compressed state in the second window set w2. On the other hand, each protruding portion 641 makes contact at an R2-side end surface 641b thereof (exemplary first contact surface) with the R1-side end surface of the coil spring 51 disposed in the compressed state in the first window set w1.

As described above, each protruding portion 641 of the friction plate 64 is pressed in opposite directions by the pair of compressed coil springs 51. Therefore, in the neutral condition, the friction plate 64 and the first bushing 61 rotated in synchronization therewith are configured to be constantly set in the neutral position.

Torsional Characteristics: Without Hysteresis Torque

Figure 7:
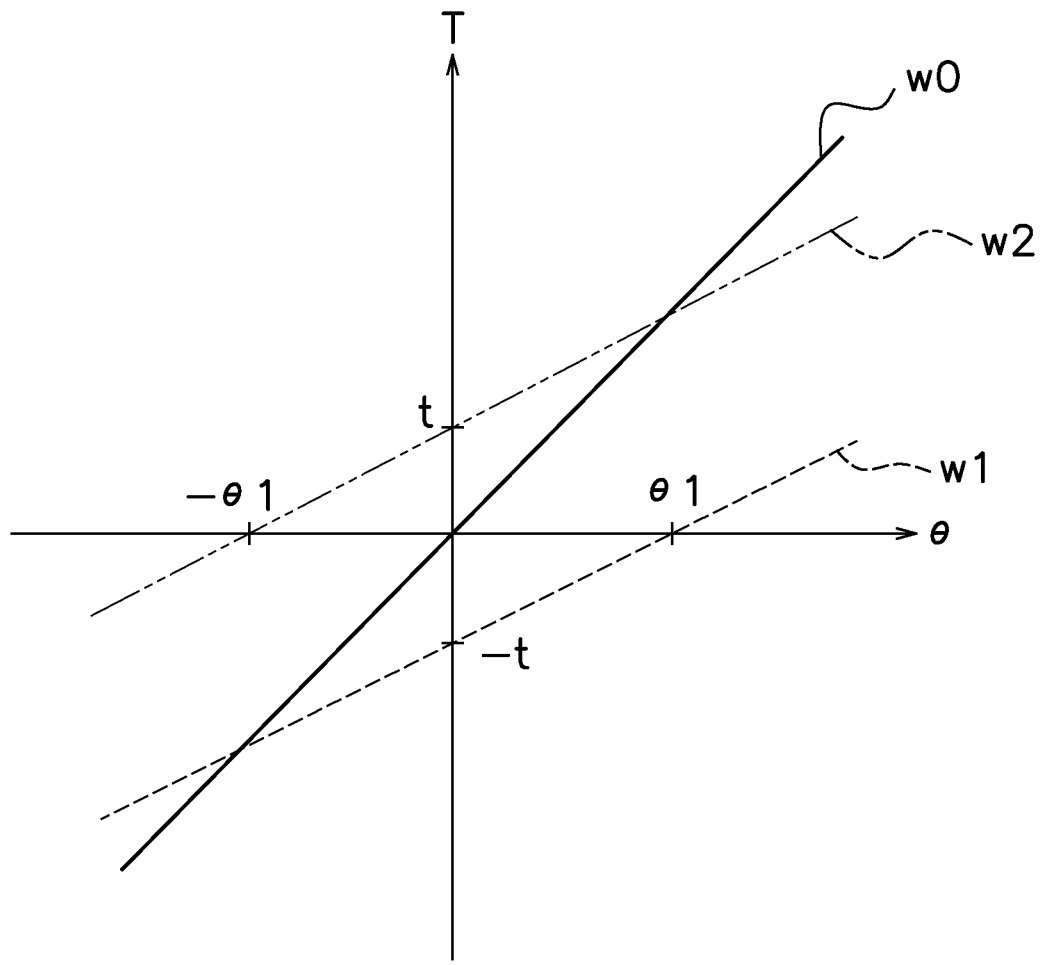
FIG. 7 is a chart showing torsional characteristics.

First, torsional characteristics, exerted by the four coil springs 51 in a condition without hysteresis torque, will be herein explained for easy explanation of actions. In FIG. 7, broken line represents a torsional characteristic (w1) of the coil spring 51 in each first window set w1, dashed two-dotted line represents a torsional characteristic (w2) of the coil spring 51 in each second window set w2, and solid line represents a net torsional characteristic (w0) of the torsional characteristic (w1) and the torsional characteristic (w2).

First Window Sets w1

In the neutral condition without relative rotation between the input-side plate 30 and the hub flange 40, as shown in FIG. 3A, the coil spring 51 in each first window set w1 is disposed in a compressed state between the R1 support surface 301a and the R2 accommodation surface 401b. The interval between the R1 support surface 301a and the R2 accommodation surface 401b is G0 and is narrower than the width L (equal to the free length of the coil spring 51) in each of each support portion 301, 302 and each accommodation portion 401, 402. Therefore, as depicted with broken line in FIG. 7, in each first window set w1, a torsional torque −t is generated by the compressed coil spring 51.

FIG. 3B shows a condition that a torque is inputted to the damper unit 20 and torsion of the hub flange 40 with respect to the input-side plate 30 is caused from the neutral condition to the R2 side (corresponding to the positive side in the torsional characteristics) by the angle θ1. In this condition, the amount of offset between the first support portion 301 and the first accommodation portion 401 becomes "0".

Here, in each first window set w1, the interval between the R1 support surface 301a making contact with the R1-side end surface of the coil spring 51 and the R2 accommodation surface 401b making contact with the R2-side end surface of the coil spring 51 is G1 and becomes wider than the interval G0. The interval G1 is equal in magnitude to the free length of the coil spring 51. In other words, when the torsion angle between the input-side plate 30 and the hub flange 40 reaches +θ1, the coil spring 51 in each first window set w1 becomes a free-length state, whereby the torsional torque becomes "0" as shown in FIG. 7.

Moreover, when torsion of the hub flange 40 with respect to the input-side plate 30 is caused at a greater torsion angle than θ1, as shown in FIG. 3C (in which a condition made at a torsion angle θ2 (>θ1) is shown), the coil spring 51 in each first window set w1 makes contact at the R1-side end surface thereof with the R1 accommodation surface 401a, while making contact at the R2-side end surface thereof with the R2 support surface 301b. Here, the interval between the R1 accommodation surface 401a and the R2 support surface 301b is G2 and becomes narrower than the free length of the coil spring 51. In other words, when the torsion angle between the input-side plate 30 and the hub flange 40 becomes greater than θ1, the coil spring 51 is compressed from the free-length state, whereby the torsional torque gradually increases as shown in FIG. 7.

On the other hand, when torsion of the hub flange 40 with respect to the input-side plate 30 is caused from the neutral condition to the R1 side (corresponding to the negative side in the torsional characteristics), the coil spring 51 in each first window set w1 is constantly compressed between the R1 support surface 301a and the R2 accommodation surface 401b. In other words, in each first window set w1, the torsional torque increases to the negative side with increase in torsion angle in a negative-side torsional range as shown in FIG. 7.

Second Window Sets w2

In the neutral condition, the coil spring 51 in each second window set w2 is disposed in a compressed state between the R1 accommodation surface 402a and the R2 support surface 302b. The interval between the R1 accommodation surface 402a and the R2 support surface 302b is G0 and is narrower than the width L (equal to the free length of the coil spring 51) in each of each support portion 301, 302 and each accommodation portion 401, 402. Therefore, as shown in FIG. 7, in the neutral condition, a torsional torque +t is generated by the compressed coil spring 51 in each second window set w2.

When torsion of the hub flange 40 with respect to the input-side plate 30 is caused from the neutral condition to the R2 side (the positive side in the torsional characteristics), the coil spring 51 in each second window set w2 is constantly compressed between the R1 accommodation surface 402a and the R2 support surface 302b. In other words, in each second window set w2, the torsional torque increases with increase in torsion angle in a positive-side torsional range as shown in FIG. 7.

On the other hand, when torsion of the hub flange 40 with respect to the input-side plate 30 is caused from the neutral condition to the R1 side (negative side) by the angle θ1, in each second window set w2, the interval between the R1 accommodation surface 402a making contact with the R1-side end surface of the coil spring 51 and the R2 support surface 302b making contact with the R2-side end surface of the coil spring 51 becomes wider than the interval G0. The interval herein produced is equal in magnitude to the free length of the coil spring 51. In other words, when the torsion angle between the input-side plate 30 and the hub flange 40 reaches −θ1, the torsional torque in each second window set w2 becomes "0" as shown in FIG. 7.

Moreover, when torsion of the hub flange 40 with respect to the input-side plate 30 is caused at a greater torsion angle than θ1 to the R1 side, the coil spring 51 in each second window set w2 makes contact at the R1-side end surface thereof with the R1 support surface 302a, while making contact at the R2-side end surface thereof with the R2 accommodation surface 402b. Furthermore, when the torsion angle further increases, the coil spring 51 is compressed from the free-length state, whereby the torsional torque gradually increases to the negative side as shown in FIG. 7.

Net Torsional Characteristic

In FIG. 7, the torsional characteristic w0 depicted with solid line is the net torsional characteristic obtained by adding the torsional characteristic w1 depicted with broken line and the torsional characteristic w2 depicted with dashed two-dotted line and represents torsional characteristics of the entire damper unit. In other words, the torsional torque is "0" in the neutral condition and increases to both the positive side and the negative side with increase in torsion angle to both the positive side and the negative side.

Here, in the torsional characteristics of the entire damper unit, apparent torsional torque is "0" in the neutral condition. However, as described above, the positive-side torsional torque and the negative-side torsional torque act on the input-side member and the output-side member. Therefore, when the torsion angle falls in a range of −θ1 to +θ1, the input-side member and the output-side member are not rotated relative to each other. Because of this, it is possible to inhibit collision sound produced between respective members due to torque fluctuations in the torsion angular range.

On the other hand, when the torsion angle becomes greater in absolute value than ±θ1, the coil spring 51 in each first window set w1 or each second window set w2 becomes the free-length state. This configuration can further inhibit collision sound produced between respective members than a configuration that all the coil springs 51 are set in the free-length state.

Actions: With Hysteresis Torque

Next, with use of schematic diagrams of FIG. 8 and thereafter, torsional characteristics will be explained in consideration of hysteresis torque. In the schematic diagrams, the input-side plate 30 is denoted by "IP", whereas the hub flange 40 is denoted by "HF". Besides, the first bushing 61 and the friction plate 64 are collectively explained as "friction member FP". It should be noted that the schematic diagrams show conditions that the input-side plate 30 is rotated with respect to the hub flange 40 to the R1 side (the positive side in this example). However, torsional characteristics in the conditions are similar to those exerted when the input-side plate 30 is reversely rotated with respect to the hub flange 40, although this is exceptional in part of a high torsion angular range. Hence, the negative-side torsional characteristics will not be herein explained. Furthermore, in the following explanation, the angle θ1 described above will be set as "2 degrees" but this setting is exemplary only.

Neutral Condition

Figure 8:
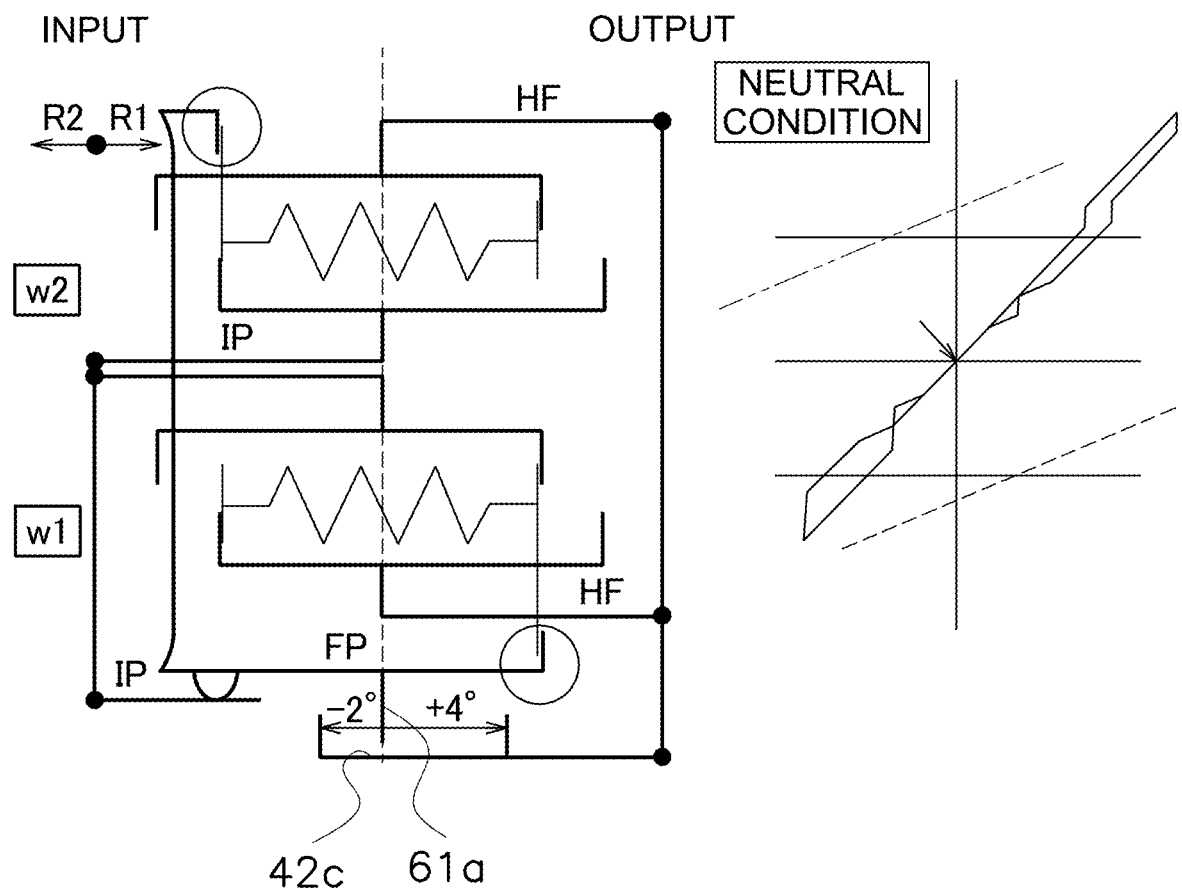
FIG. 8 is a diagram for explaining actions performed in a neutral condition.

FIG. 8 shows the neutral condition. In the neutral condition, the coil spring 51 in each window set w1, w2 is disposed in the compressed state. Besides, as described above, the contact surfaces 641a and 641b, which are the end surfaces of each protruding portion 641 of the friction plate 64, make contact with the end surfaces of the corresponding pair of coil springs 51. Hence, the friction plate 64 is set in the neutral position. Consequently, a 4-degree gap and a 2-degree gap are reliably produced between each restriction protrusion 61a of the first bushing 61 and the end surfaces of each elongated hole 42c of the flange 42. Specifically, the 4-degree gap is produced on the R1 side of each restriction protrusion 61a, whereas the 2-degree gap is produced on the R2 side of each restriction protrusion 61a.

Neutral Condition→Torsion Angle of 2 Degrees

Figure 9:
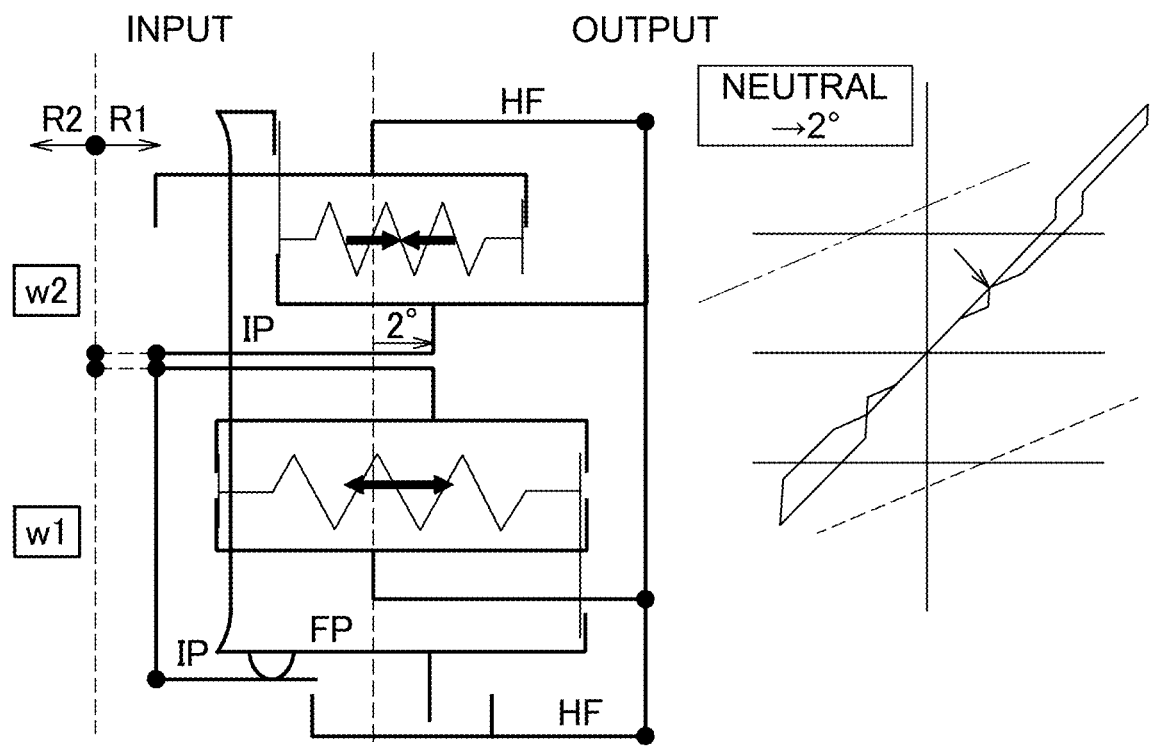
FIG. 9 is a diagram for explaining actions performed in transition from the neutral condition to torsion caused by an angle of 2 degrees.

FIG. 9 shows a condition that torsion of the input-side plate IP with respect to the hub flange HF is caused from the neutral condition to the R1 side by 2 degrees. Here, the coil spring 51 in each first window set w1 extends from the compressed state to the free-length state, whereas the coil spring 51 in each second window set w2 is further compressed from the compressed state made in the neutral condition.

Besides, the end surfaces of the coil spring 51 in each window set w1, w2 are moved in the rotational direction. Hence, the friction member FP is rotated as well. However, in the torsion angular range (neutral→2 degrees), each restriction protrusion 61a of the first bushing 61 does not make contact with the corresponding end surface of each elongated hole 42c of the flange 42. Therefore, the friction member FP (the first bushing 61 and the friction plate 64) and the first plate 31 are rotated in synchronization with each other; a hysteresis torque is not generated between the first bushing 61 and the input-side plate IP (the first plate 31). On the other hand, the second bushing 62 is rotated together with the input-side plate IP (the second plate 32); a hysteresis torque is not generated as well between the second bushing 62 and the friction plate 64.

Torsion Angle of 2 Degrees→4 Degrees

Figure 10:
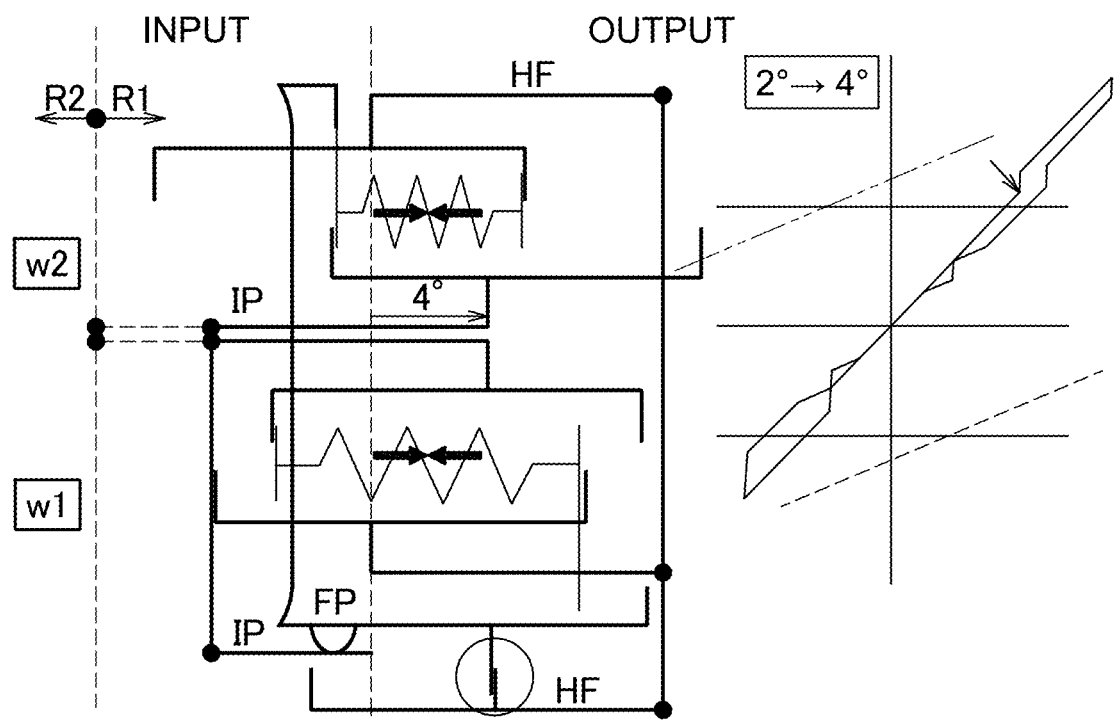
FIG. 10 is a diagram for explaining actions performed in transition from the torsion caused by an angle of 2 degrees to that caused by an angle of 4 degrees.

FIG. 10 shows a condition that torsion of the input-side plate IP with respect to the hub flange HF is caused by 4 degrees to the R1 side. Here, the coil spring 51 in each first window set w1 is compressed from the free-length state, whereas the coil spring 51 in each second window set w2 is further compressed from the compressed state.

Each restriction protrusion 61a of the first bushing 61 does not make contact with the corresponding end surface of each elongated hole 42c of the flange 42 until the torsion angle reaches 4 degrees. Therefore, a hysteresis torque is not generated similarly to the above.

Torsion Angle of 4 Degrees→7 Degrees

Figure 11:
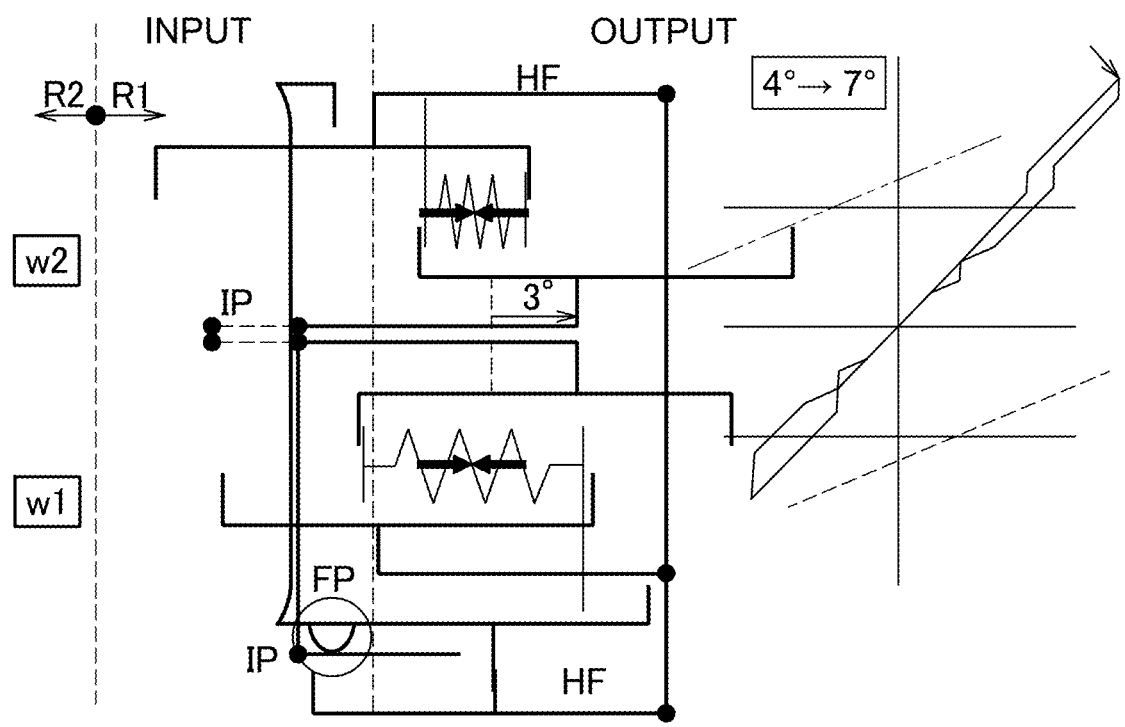
FIG. 11 is a diagram for explaining actions performed in transition from the torsion caused by an angle of 4 degrees to that caused by an angle of 7 degrees.

FIG. 11 shows a condition that torsion of the input-side plate IP with respect to the hub flange HF is caused by 7 degrees to the R1 side. Both the coil spring 51 in each first window set w1 and that in each second window set w2 are herein further compressed from the compressed state.

When the torsion angle becomes 4 degrees or greater, each restriction protrusion 61a of the first bushing 61 makes contact with the corresponding end surface of each elongated hole 42c of the flange 42. Because of this, the friction member FP is prevented from being moved (i.e., rotated) to the R1 side. Thus, when the input-side plate IP is rotated with respect to the hub flange HF by a torsion angle of 4 degrees or greater, the friction member FP is prevented from being rotated, whereby frictional contact is caused between the first bushing 61 and the input-side plate IP (the first plate 31); a hysteresis torque is generated therebetween. On the other hand, the second bushing 62 is rotated together with the input-side plate IP (the second plate 32); a hysteresis torque is generated as well between the second bushing 62 and the friction plate 64.

Besides, as shown in FIG. 10, during transition from the torsion caused by 2 degrees to that caused by 4 degrees, each contact surface 641a, 641b of the friction plate 64 gradually separates from the corresponding end surface of the coil spring 51 in each first window set w1, whereby a gap corresponding to 2 degrees (exemplary minute torsion angle) is produced therebetween when the torsion angle is 4 degrees. Then, when the torsion angle is 4 degrees or greater, the 2-degree gap is constantly maintained. The angle of this gap (i.e., 2 degrees) is obtained by subtracting the torsion angle corresponding to the amount of offset (i.e., 2 degrees) from the angle corresponding to the gap produced on the R1 side of each restriction protrusion 61a in each hole 42c (i.e., 4 degrees). Therefore, the friction member FP can be actuated together with the input-side plate IP in an angular range of 2 degrees described above (relative torsion angle) included in the high torsion angular range that the torsion angle is 4 degrees or greater. In other words, a hysteresis torque is not generated when the relative torsion angle falls in the angular range of 2 degrees. It should be noted that the minute torsion angle, at which a hysteresis torque is not generated, thus exists in the high torsion angular range but does not exist in the negative-side torsional characteristics.

Therefore, a relatively large hysteresis torque can be obtained in the high torsion angular range that the torsion angle (absolute angle) is 4 degrees or greater. Besides, even when the absolute torsion angle is 4 degrees or greater, a hysteresis torque is not generated if the relative torsion angle between the input-side plate IP and the hub flange HF falls in the angular range of 2 degrees. Therefore, minute torque fluctuations can be effectively attenuated in a traveling range corresponding to the high torsion angular range in the torsional characteristics.

Restoration to Neutral Condition: Torsion Angle of 7 Degrees→5 Degrees

Figure 12:
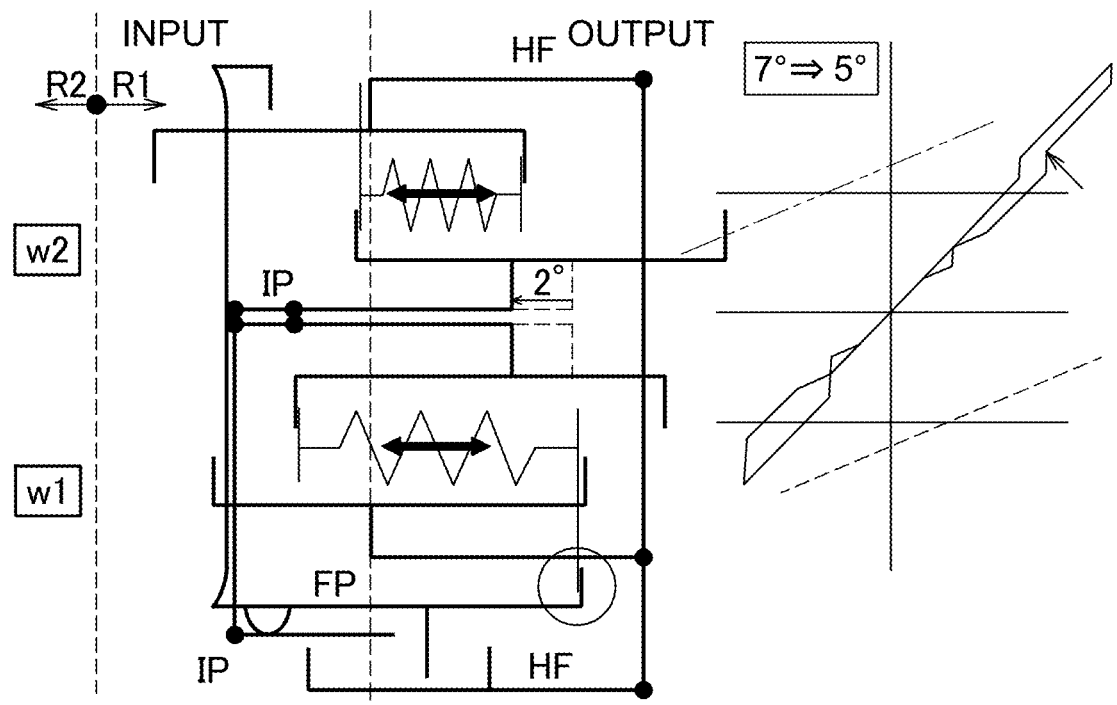
FIG. 12 is a diagram for explaining actions performed in transition from the torsion caused by an angle of 7 degrees to that caused by an angle of 5 degrees.

FIG. 12 shows that torsion of the input-side plate IP with respect to the hub flange HF caused by 5 degrees to the R1 side is restored from the torsion caused by 7 degrees to the R1 side. When the torsion is thus restored by an angle of 2 degrees (i.e., minute torsion angle), one contact surface of the friction member FP makes contact with the corresponding end surface of the coil spring 51 in each first window set w1. Therefore, as described above, a hysteresis torque is not generated in the torsion angular range of 7 degrees to 5 degrees. However, when the torsion is further restored from the condition made at the torsion angle of 5 degrees, the input-side plate IP is rotated but the friction member FP is prevented from being moved (rotated). Because of this, when the torsion is restored by the angle of 2 degrees, a hysteresis torque is generated thereafter.

Restoration to Neutral Condition: Torsion Angle of 5 Degrees→3 Degrees

Figure 13:
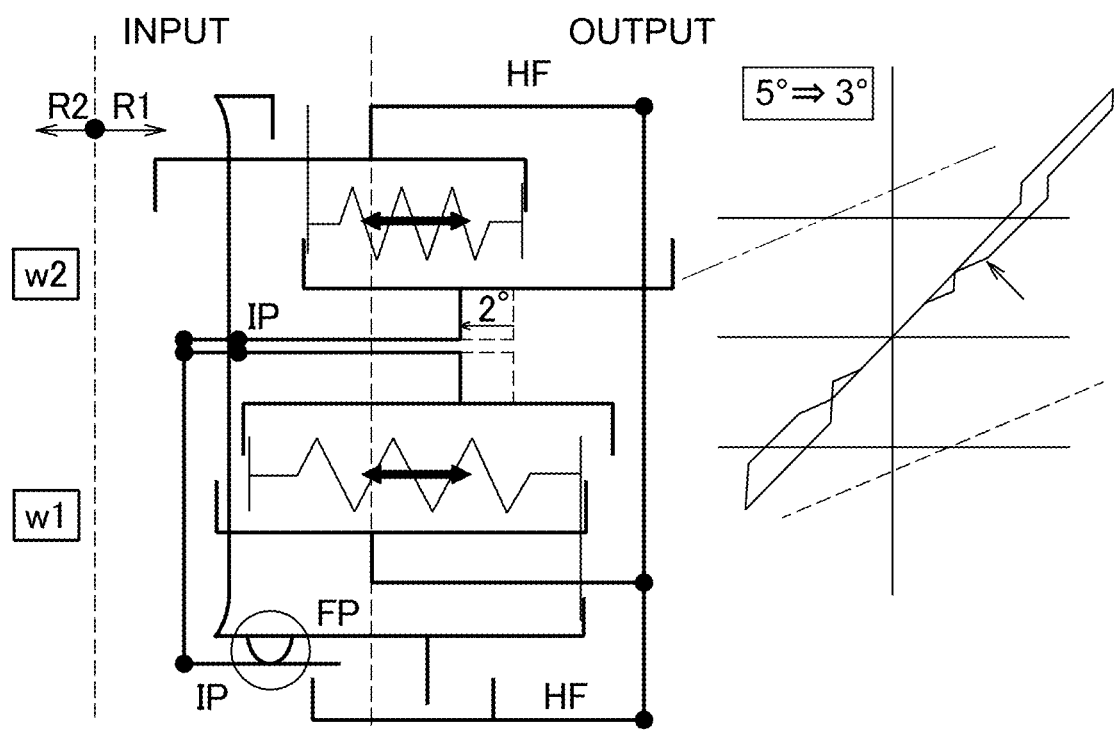
FIG. 13 is a diagram for explaining actions performed in transition from the torsion caused by an angle of 5 degrees to that caused by an angle of 3 degrees.

FIG. 13 shows that torsion of the input-side plate IP with respect to the hub flange HF caused by 3 degrees to the R1 side is further restored from the torsion made so far. When the neutral condition is restored, the coil spring 51 in each window set w1, w2 extends from the compressed state made so far and is thereby reduced in compression amount. It should be noted that when the torsion angle reaches 2 degrees, the coil spring 51 in each first window set w1 becomes the free-length state. Then, when the torsion angle further reduces, the coil spring 51 in each first window set w1 is compressed.

Now in the R1-side torsional range, the coil spring 51 in each first window set w1 is smaller in compression amount than the coil spring 51 in each second window set w2. On the other hand, in a range that the torsion angle exceeds 4 degrees, a hysteresis torque is generated. Therefore, when the torsion angle reaches 3 degrees (exemplary only), in restoration to the neutral condition from a condition made at a large torsion angle, the torques generated by the coil springs 51 in the first window sets w1 and the hysteresis torque generated by the hysteresis generating mechanism 60 are balanced. Because of this, the coil spring 51 in each first window set w1 is prevented from further extending from the state thereof made at this moment by the hysteresis torque. In other words, when the torsion angle becomes 3 degrees or less in restoration to the neutral condition, the coil spring 51 in each first window set w1 is not actuated until the torsion angle reaches a predetermined angle; only the coil spring 51 in each second window set w2 contributes to the torsional stiffness of the entire device (specifically, with one-half of the stiffness in the net characteristic).

Besides, the coil spring 51 in each first window set w1 is not further rotated, while making contact at the R1-side end surface thereof with the hub flange HF. Besides, each contact surface 641b of the friction plate 64 makes contact with the corresponding end surface of the coil spring 51 in each first window set w1. Hence, the friction member FP is not actuated (rotated) as well. On the other hand, the input-side plate IP is rotated. Hence, a hysteresis torque is generated therebetween in the torsion angular range of 5 degrees to 3 degrees.

<Restoration to Neutral Condition: Torsion Angle of 3 Degrees→2 Degrees>

Figure 14:
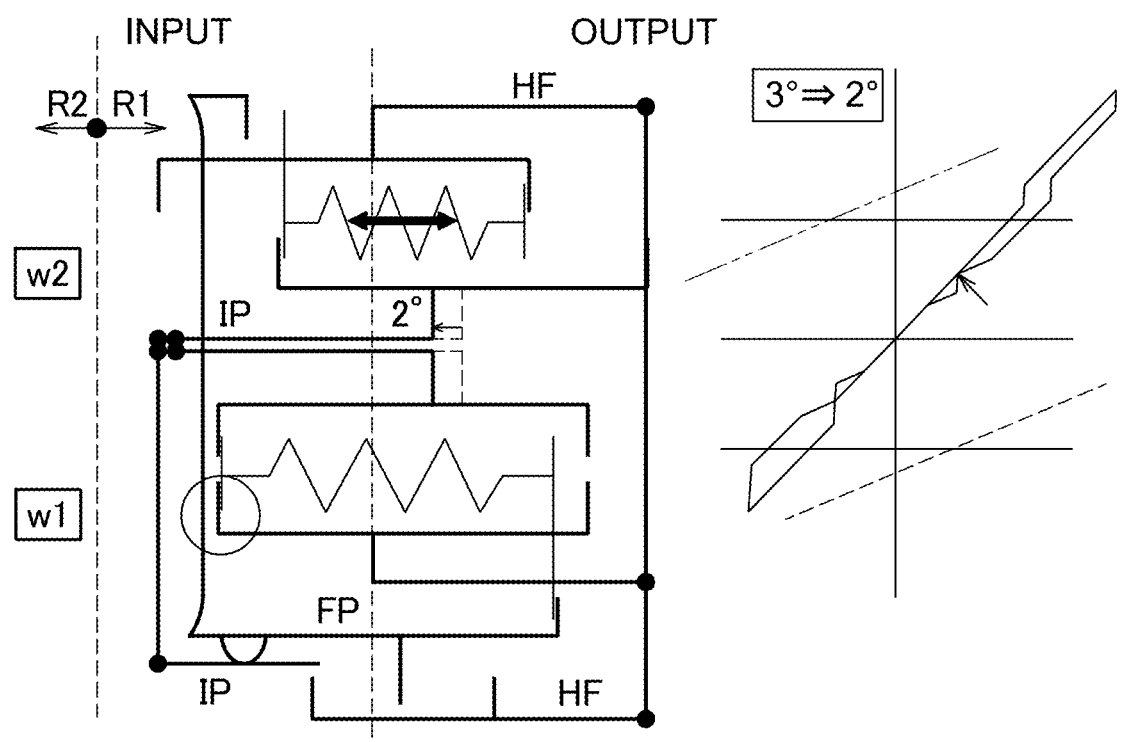
FIG. 14 is a diagram for explaining actions performed in transition from the torsion caused by an angle of 3 degrees to that caused by an angle of 2 degrees.

FIG. 14 shows transition from the torsion caused by 3 degrees to that caused by 2 degrees. In this case, the torque generated by the coil spring 51 in each first window set w1 further reduces. Therefore, in this torsion angular range (3 degrees→2 degrees), similarly to the above, the coil spring 51 in each first window set w1 is not actuated (extended), and only the coil spring 51 in each second window set w2 contributes to the torsional stiffness of the entire device. Besides, in the torsion angular range of 3 degrees to 2 degrees, the friction member FP and the input-side plate IP are configured to be rotated in conjunction with each other due to the hysteresis torque. Hence, a hysteresis torque is not generated therebetween.

<Torsion Angle of 2 degrees to Neutral Condition>

Figure 15:
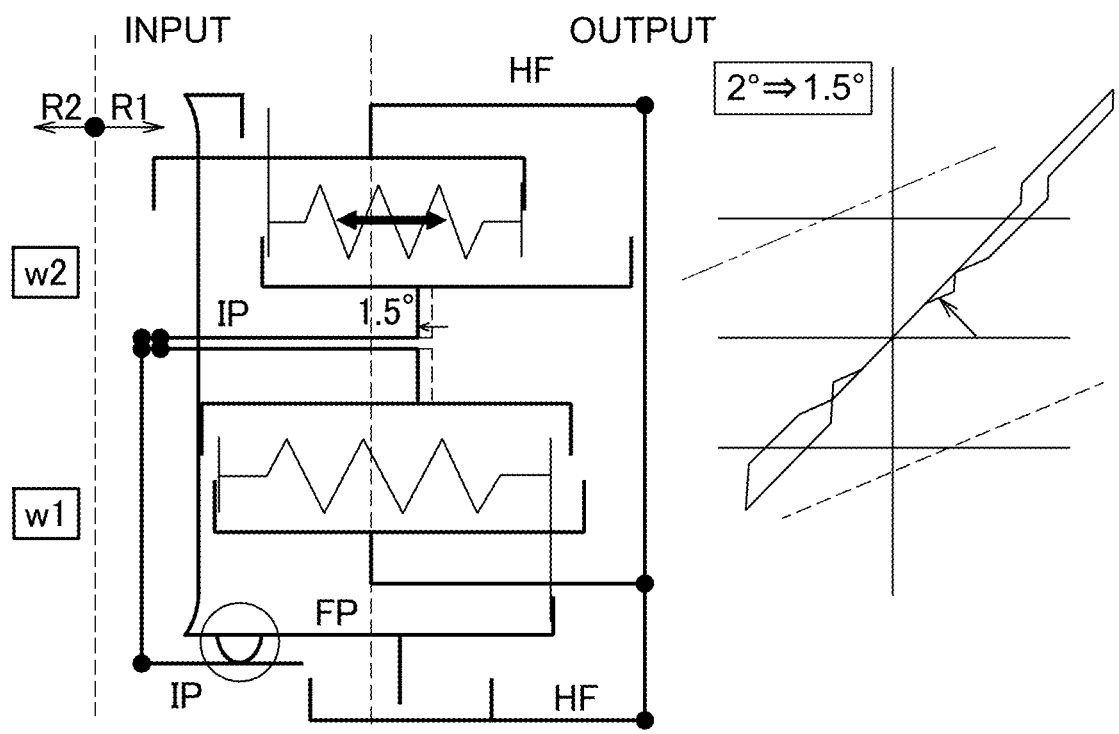
FIG. 15 is a diagram for explaining actions performed in transition from the torsion caused by an angle of 2 degrees to that caused by an angle of 1.5 degrees.

FIG. 15 shows transition from the torsion caused by 2 degrees to that caused by 1.5 degrees. In the condition made at a torsion angle of 2 degrees shown in FIG. 14, the coil spring 51 in each first window set w1 makes contact at the R2-side end surface thereof with the R2-side end surface of the input-side plate IP and that of the hub flange HF. Then, when the torsion angle becomes less than 2 degrees, the coil spring 51 in each first window set w1 is configured to make contact at the R2-side end surface thereof with the R2-side end surface of the hub flange HF. Because of this, in the torsion angular range of less than 2 degrees, the friction member FP receives repulsion from the coil spring 51 in each first window set w1 and is disabled to be rotated in conjunction with the input-side plate IP. Consequently, a hysteresis torque is generated in accordance with a force (torque) by which the coil spring 51 in each first window set w1 is compressed.

Figure 16:
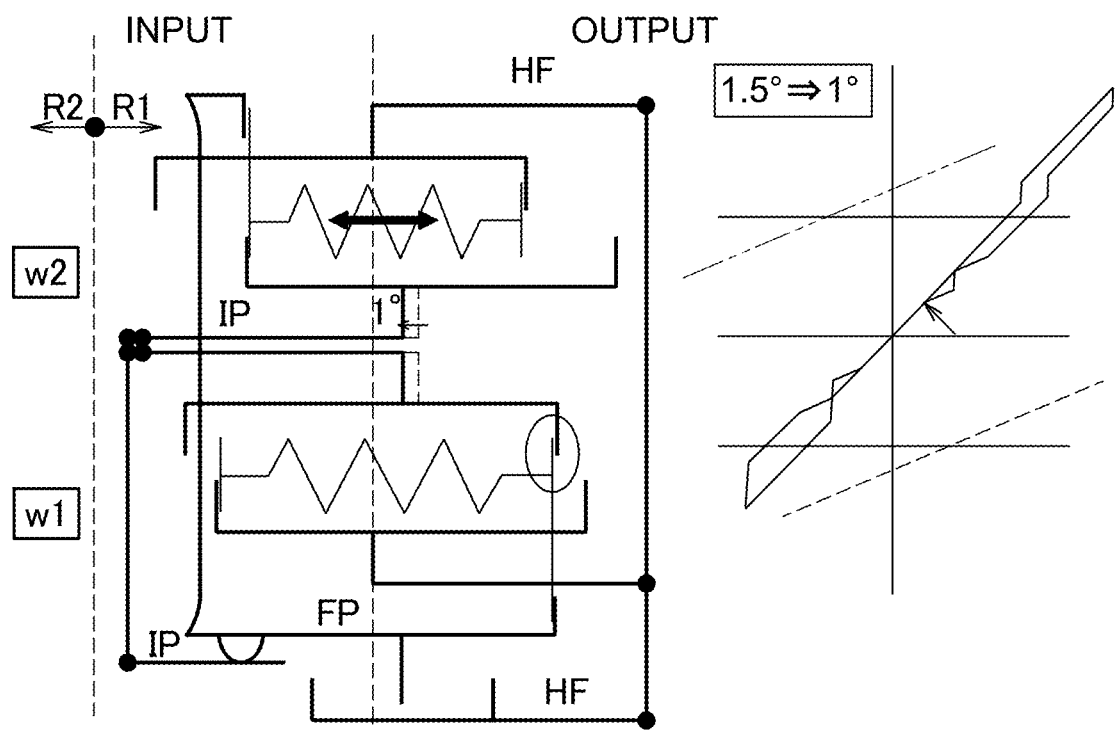
FIG. 16 is a diagram for explaining actions performed in transition from the torsion caused by an angle of 1.5 degrees to that caused by an angle of 1 degree.

FIG. 16 shows transition from the torsion caused by 1.5 degrees to that caused by 1 degree. When the torsion angle reaches 1 degree, the coil spring 51 in each first window set w1 makes contact at the R1-side end surface thereof with the corresponding end surface of the input-side plate IP. Because of this, during transition from the torsion caused by 1 degree to the neutral condition, the coil spring 51 in each first window set w1 and that in each second window set w2 are actuated, whereby as the torsional stiffness of the entire device, a net stiffness is obtained by adding the stiffness of the coil spring 51 in each first window set w1 and that of the coil spring 51 in each second window set w2. Besides, at this moment, the friction member FP (the first bushing 61 and the friction plate 64) is set in the neutral position.

Figure 17:
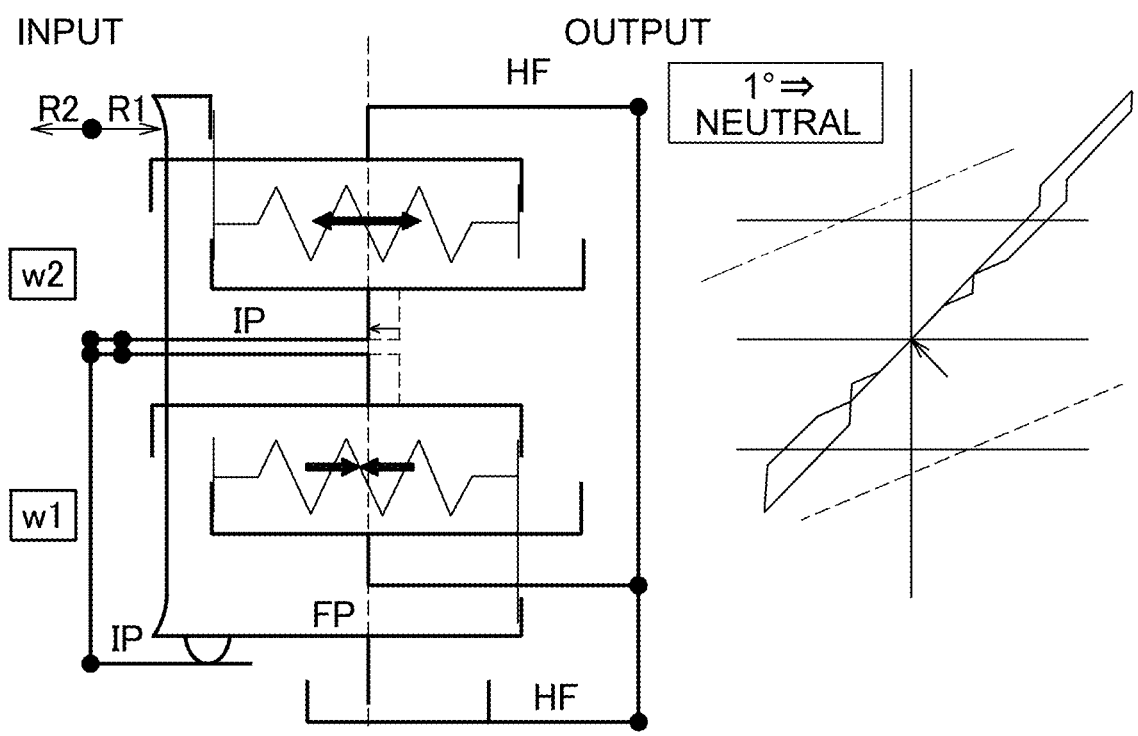
FIG. 17 is a diagram for explaining actions performed in transition from the torsion caused by an angle of 1 degree to the neutral condition.

FIG. 17 shows transition from the torsion caused by 1 degree to the neutral condition. Here, the input-side plate IP is restored together with the friction member FP to the neutral condition; a hysteresis torque is not generated during the transition.

As described above, in the present preferred embodiment, a small hysteresis torque can be obtained in the low torsion angular range that the torsion angle is small. On the other hand, a sufficient hysteresis torque can be obtained in the high torsion angular range that the torsion angle is 4 degrees or greater. Besides, minute torque fluctuations can be effectively attenuated when torsion is caused between the input-side plate 30 and the hub flange 40 in the minute torsion angular range by the minute torque fluctuations. Furthermore, the characteristics described above can be realized by the hub flange of an integrated type.

It should be noted that in the torsional characteristics of the present preferred embodiment, when torsion is caused from the neutral condition to the R1 side, a hysteresis torque is not generated until the torsion angle reaches 4 degrees. Contrarily, when the neutral condition is restored from the torsion caused by 4 degrees, a hysteresis torque is generated in a predetermined torsion angular range. However, in restoration to the neutral condition, a hysteresis torque is not generated in reverse transition from the torsion caused by less than 4 degrees to that caused by 4 degrees. Because of this, a small hysteresis torque can be obtained in the low torsion angular range.

Other Preferred Embodiments

The present invention is not limited to the preferred embodiment described above, and a variety of changes or modifications can be made without departing from the scope of the present invention.

(a) In the preferred embodiment described above, the first bushing 61 and the friction plate 64 are provided as the friction member of the hysteresis generating mechanism. However, the friction plate can be omitted by providing the first bushing with a function of the friction plate.

(b) The width of each support portion 301, 302, the width of each accommodation portion 401, 402, the length of each coil spring 51, or numeric values specifically set for the torsion angle are exemplary only and are not limited to the settings.

(c) In the preferred embodiment described above, all the coil springs are set to be equal in stiffness. However, coil springs herein used can be different in stiffness from each other.

(d) The number of accommodation portions, that of support portions, and that of coil springs are exemplary only and are not limited to those in the preferred embodiment described above.

REFERENCE SIGNS LIST

1 Damper device
30 Input-side plate (first rotor)
301 First support portion
302 Second support portion
301a, 302a R1 support surface
301b, 302b R2 support surface
40 Hub flange (second rotor)
401 First accommodation portion
402 Second accommodation portion
401a, 402a R1 accommodation surface
401b, 402b R2 accommodation surface
50 Elastic coupling part
51 Coil spring (first elastic member, second elastic member)
61 First bushing
62 Second bushing
64 Friction plate
641 Protruding portion
641a, 641b Contact surface

What is claimed is:

1. A damper device, comprising:
a first rotor by which torque is input into the damper device and arranged to be rotated about a rotational axis;
a second rotor by which torque is output from the damper device and arranged to be rotated about the rotational axis, the second rotor disposed to be rotatable relative to the first rotor;
an elastic coupling part including a first elastic member and a second elastic member, the elastic coupling part configured to elastically couple the first and second rotors in a rotational direction; and
a hysteresis generating mechanism configured to generate a hysteresis torque when torsion is caused by rotation of the second rotor relative to the first rotor, the hysteresis generating mechanism including a friction member configured to cause friction by sliding relative to the first or the second rotor,
wherein the friction member of the hysteresis generating mechanism does not cause friction by sliding relative to either the first rotor or the second rotor in a first torsion angular range extending from a neutral condition where there is no torsion between the first and second rotors to a first torsion angle in the rotational direction,
the friction member causes friction by sliding relative to the first or second rotor so as to generate the hysteresis torque in a second torsion angular range exceeding the first torsion angle, the friction member not causing friction by sliding relative to the first and second rotors in a predetermined torsion angular sub-range within the second torsion angular range, the friction member is further configured to be held in a neutral position by contact with and compression of the first and second elastic members when the first and second rotors are in the neutral condition, the first rotor includes a first support portion with a width in the circumferential direction of the first rotor and a second support portion with a width in the circumferential direction of the first rotor, and the second rotor includes a first accommodation portion with a width in the circumferential direction of the second rotor and a second accommodation portion with a width in the circumferential direction of the second rotor, the width of the first accommodation portion being the same as the width of the first support portion and the width of the second accommodation portion being the same as the width of the second support portion, the first accommodation portion is disposed to overlap in part the first support portion and to be angularly offset from the first support portion in the first rotational direction when the first and second rotors are in the neutral condition, and the second accommodation portion is disposed to overlap in part the second support portion and to be angularly offset from the second support portion in the second rotational direction when the first and second rotors are in the neutral condition, and the first elastic member is compressed in the first support portion and the first accommodation portion when the first and second rotors are in the neutral condition, and the second elastic member is compressed in the second support portion and the second accommodation portion when the first and second rotors are in the neutral condition, the second elastic member actuated in parallel with the first elastic member and expansionary forces within the first and second elastic members counteracting each other when the first and second rotors are in the neutral condition to hold the first and second rotors in the neutral condition and the friction member in the neutral position.

2. The damper device according to claim 1, wherein the amount of angular offset in the first rotational direction of the first accommodation portion relative to the first support portion is equal to the amount of angular offset in the second rotational direction of the second accommodation portion relative to the second support portion, the first torsion angle is greater than a torsion angle corresponding to the amount of angular offset, the friction member does not cause friction by sliding relative to either the first rotor or the second rotor when the first and second rotors are rotated relative to each other from the neutral condition by the torsion angle corresponding to the amount of angular offset and when the torsion is caused by relative rotation between the first and second rotors from the neutral condition to the first torsion angle, and the friction member causes friction by sliding relative to either the first or the second rotor when the first and second rotors rotate relative to each other by the torsion angle corresponding to the amount of angular offset, the friction member not causing friction by sliding relative to either the first rotor or the second rotor in a torsion angular range of a difference between the first torsion angle and the torsion angle corresponding to the amount of angular offset.

3. The damper device according to claim 2, wherein the friction member is rotatable relative to the first or second rotor until the torsion is equal to the torsion angle corresponding to the amount of angular offset and until the torsion is equal to the first torsion angle.

4. The damper device according to claim 1, wherein the friction member includes first and second contact surfaces that face in opposite rotational directions, with an end surface of one of the first and second elastic members being arranged to make contact with one of the first and second contact surfaces and an end surface of the other of the first and second elastic members being arranged to make contact with the other of the first and second contact surfaces.

5. The damper device according to claim 1, wherein when in an uncompressed free state, the length of the first elastic member is the same as the widths of the first support portion and the first accommodation portion in the circumferential directions of the first and second rotors, respectively, and when in an uncompressed free state, the length of the second elastic member is the same as the widths of the second support portion and the second accommodation portion in the circumferential directions of the first and second rotors, respectively, the angular offset of the first accommodation portion relative to the first support portion causes 1) the first elastic member to transition from an initial compressed state thereof to its uncompressed free state and then to be further recompressed as the first rotor rotates from the neutral condition in the first rotational direction with respect to the second rotor, and 2) the first elastic member to be further compressed from the initial compressed state thereof as the first rotor rotates from the neutral condition in the second rotational direction with respect to the second rotor, and the angular offset of the second accommodation portion relative to the second support portion causes 1) the second elastic member to transition from an initial compressed state thereof to its uncompressed free state and then to be recompressed as the first rotor rotates from the neutral condition in the second rotational direction with respect to the second rotor, and 2) the second elastic member to be further compressed from the initial compressed state thereof as the first rotor rotates from the neutral condition in the second rotational direction with respect to the second rotor.

6. The damper device according to claim 5, wherein the first and second support portions each include a first support surface at a first-rotational-direction end thereof, and the first and second support portions each include a second support surface at a second-rotational-direction end thereof, the first and second accommodation portions each include a first accommodation surface at a first-rotational-direction end thereof, and the first and second accommodation portions each include a second accommodation surface at a second-rotational-direction end thereof, when compressed, the first elastic member is disposed between the first support surface and the second accommodation surface, and when compressed, the second elastic member is disposed between the first accommodation surface and the second support surface.

7. The damper device according to claim 1, wherein the first and second elastic members are equal in stiffness.

8. The damper device according to claim 1, wherein
the elastic coupling part further includes a third elastic member and a fourth elastic member, the third and fourth elastic members each being in an initial compressed state when the first and second rotors are in the neutral condition,
the third elastic member transitions from its initial compressed state to a free state thereof and then is recompressed as the first rotor rotates from the neutral condition in the first rotational direction with respect to the second rotor, and
the fourth elastic member transitions from its initial compressed state to a free state thereof and then is recompressed the first rotor rotates from the neutral condition in the second rotational direction with respect to the second rotor.

9. The damper device according to claim 8, wherein
the first rotor further includes a third support portion and a fourth support portion, the third support portion being located across the rotational axis from the first support portion, and the fourth support portion being located across the rotational axis from the second support portion,
the second rotor further includes a third accommodation portion and a fourth accommodation portion, the third accommodation portion being located across the rotational axis from the first accommodation portion, and the fourth accommodation portion being located across the rotational axis from the second accommodation portion,
the third accommodation portion is disposed to overlap in part the third support portion and to be angularly offset therefrom in the first rotational direction,
the fourth accommodation portion is disposed to overlap in part the fourth support portion and to be angularly offset therefrom in the second rotational direction,
the third elastic member is disposed in an initial compressed state thereof in the third support portion and the third accommodation portion when the first and second rotors are in the neutral condition, and
the fourth elastic member is disposed in an initial compressed state thereof in the fourth support portion and the fourth accommodation portion when the first and second rotors are in the neutral condition, the fourth elastic member being actuated in parallel with the third elastic member.

* * * * *